US008310714B2

(12) United States Patent
Matsumura

(10) Patent No.: US 8,310,714 B2
(45) Date of Patent: Nov. 13, 2012

(54) PRINT CONTROL APPARATUS FOR CONTROLLING PRINTING OF AN AUXILIARY IMAGE BASED ON A NUMBER OF SHEETS TO BE PRINTED

(75) Inventor: Akiko Matsumura, Koganei (JP)

(73) Assignee: Canon Kabushiki Kaisha, Tokyo (JP)

( * ) Notice: Subject to any disclaimer, the term of this patent is extended or adjusted under 35 U.S.C. 154(b) by 797 days.

(21) Appl. No.: 12/470,007

(22) Filed: May 21, 2009

(65) Prior Publication Data

US 2009/0290170 A1 Nov. 26, 2009

(30) Foreign Application Priority Data

May 26, 2008 (JP) ................................. 2008-136684

(51) Int. Cl.
*G06F 3/12* (2006.01)
*G06K 15/00* (2006.01)
*G03G 15/00* (2006.01)

(52) U.S. Cl. ...... 358/1.18; 358/1.15; 399/407; 399/408; 399/410

(58) Field of Classification Search ................. 358/1.15, 358/1.18; 399/407, 408, 410
See application file for complete search history.

(56) References Cited

U.S. PATENT DOCUMENTS

| | | | | |
|---|---|---|---|---|
| 7,072,076 | B2 * | 7/2006 | Lapstun et al. | 358/2.1 |
| 2003/0093670 | A1 * | 5/2003 | Matsubayashi et al. | 713/168 |
| 2003/0223780 | A1 | 12/2003 | Kobayashi | |
| 2007/0057987 | A1 * | 3/2007 | Miyamoto et al. | 347/19 |
| 2008/0117450 | A1 * | 5/2008 | Claiborne et al. | 358/1.15 |

FOREIGN PATENT DOCUMENTS

| | | | |
|---|---|---|---|
| JP | 2004-093856 | A | 3/2004 |
| JP | 2006-268318 | A | 10/2006 |

* cited by examiner

*Primary Examiner* — Twyler Haskins
*Assistant Examiner* — Fred Guillermety
(74) *Attorney, Agent, or Firm* — Canon USA Inc. IP Division

(57) ABSTRACT

A print control apparatus includes an input unit configured to input a binding position of sheets related to a binding processing for the sheets on each of which an image is printed based on print data, a setting unit configured to set a printing position of an auxiliary image of transparent color to be printed with the image that is printed based the print data, according to the binding position of the sheets input by the input unit, and a print control unit configured, based on the printing position of the auxiliary image set by the setting unit, to control printing of the auxiliary image.

13 Claims, 21 Drawing Sheets

FIG.16

| ID | PRINT SETTING | | | | | | | | | | |
|---|---|---|---|---|---|---|---|---|---|---|---|
| | PRINT CONDITIONS | | | | NUMBER OF EXECUTION | PRINT SIDE | PRINT POSITION | PRINT PATTERN | | | |
| | BOOKBINDING | BINDING POSITION | PRINT DIRECTION | OPEN DIRECTION | | | | PATTERN TYPE | PATTERN SIZE | PATTERN INTERVAL | PATTERN COLOR |
| 1 | CASE BINDING | LEFT | HORIZONTAL | LEFTWARD | 10 | BOTH SIDES | RIGHT | POLKA-DOT | LARGE | LARGE | TRANSPARENT |
| 2 | SADDLE STITCHING BOOKBINDING | RIGHT | VERTICAL | RIGHTWARD | 6 | FRONT SIDE | LEFT | STRIPE | MEDIUM | MEDIUM | BLACK |
| 3 | STAPLE | UPPER LEFT CORNER | HORIZONTAL | LEFTWARD | 2 | BACK SIDE | LOWER RIGHT CORNER | POLKA-DOT | SMALL | SMALL | TRANSPARENT |

FIG.18
| | CASE BINDING | SADDLE STITCHING BOOKBINDING | | STAPLE |
|---|---|---|---|---|
| | | LESS THAN N PAGES | N PAGES OR MORE | |
| BOOKBINDING (LEFT SIDE) (STAPLE:UPPER LEFT CORNER) | 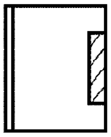 | 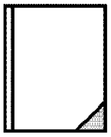 | 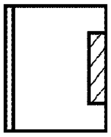 | 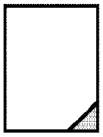 |
| BOOKBINDING (RIGHT SIDE) (STAPLE:UPPER RIGHT CORNER) | 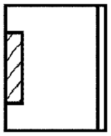 | 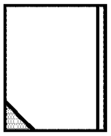 | 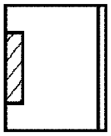 | 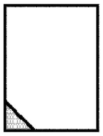 |

PRINT CONTROL APPARATUS FOR CONTROLLING PRINTING OF AN AUXILIARY IMAGE BASED ON A NUMBER OF SHEETS TO BE PRINTED

BACKGROUND OF THE INVENTION

1. Field of the Invention

The present invention relates to a print control apparatus, a control method for the print control apparatus, and a storage medium storing a program for controlling the print control apparatus.

2. Description of the Related Art

Recently, the number of printing apparatuses that can perform a variety of finishing processes by using a post-processing unit after printing has increased. Examples of finishing processes may include case bookbinding, saddle stitching bookbinding, and stapling. In case bookbinding, a plurality of printed sheets that constitute a main body are wrapped by a cover, and a back face thereof is pasted to output as a print product.

In saddle stitching bookbinding, a finishing processing on a plurality of printed sheets are saddle stitched to output it in a half folded state at a saddle stitching position. In stapling, a bundle of sorted output sheets is bound by a staple. Along with an advance of a finishing processing technique, a greater number of sheets can be book-bound at a time.

After performing the finishing processing, when many sheets are output at a time while paper edges are aligned, the sheets stick together due to electrostatic force. Consequently it is difficult for a user to turn pages. As one of causes thereof, a unification of cross-sections of paper may be pointed out. The unification of cross-section of paper is a phenomenon that paper edges of sheets are aligned by cutting or the like. As the result, it is difficult to put fingers between sheets of paper so that it becomes difficult to turn pages using ones fingers.

To solve this problem, Japanese Patent Application Laid-Open No. 2004-93856 discusses a method for preventing the unification of cross-section. Japanese Patent Application Laid-Open No. 2004-93856 discusses an image forming apparatus with a sheet post-processing apparatus for producing a pamphlet that is easy to turn pages by performing a saddle stitching processing or a folding processing on a bundle of sheets whose ends are set out of alignment.

However, in a method discussed in Japanese Patent Application Laid-Open No. 2004-93856, sheets are bound while they are set out of alignment. As a result, an intended appearance of bookbinding cannot be obtained. Incidentally, when performing a cutting processing, it does not work even if the edges of the sheets are set out of alignment. Further, when performing a case binding processing, it is difficult to change the position of each sheet edge because a back face must be pasted.

Hence, an auxiliary image can be printed at a position that is used to turn pages. In this way, a book that is easy to turn pages is obtained. The auxiliary image is printed on a sheet in order to make it easy to turn pages when sheets are bound.

FIG. 20 illustrates a print product where an auxiliary image is printed when viewed from the front. In FIG. 20, as a position used to turn bound sheets with fingers, an auxiliary image is printed at a center of an opposite side of a binding position. FIG. 21 illustrates a print product where an auxiliary image is printed when viewed from the cross-section. A clearance (transparence) is secured between sheets by an auxiliary image, and thus it is easy to hook fingers on the sheet when turning sheets. However, since a printing position of an auxiliary image needs to be designated each time it is printed, a setting thereof is difficult.

SUMMARY OF THE INVENTION

The present invention is directed to providing an improved print control apparatus. Further, the present invention is directed to providing a print control apparatus, a control method for the print control apparatus, and a control program for setting a printing position of an auxiliary image.

According to an aspect of the present invention, a print control apparatus includes an input unit configured to input a binding position of sheets related to a binding processing for the sheets on each of which an image is printed based on print data, a setting unit configured to set a printing position of an auxiliary image of transparent color to be printed with the image that is printed based on the print data, according to the binding position of the sheets input by the input unit, and a print control unit configured, based on the printing position of the auxiliary image set by the setting unit, to control printing of the auxiliary image.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 16 is a table illustrating a list of print settings of auxiliary images set by print settings of auxiliary images according to the second exemplary embodiment.

FIG. 18 is a table illustrating a list of a result of executing an automatic setting of printing positions of auxiliary images in an image data generation of auxiliary images according to the third exemplary embodiment.

DETAILED DESCRIPTION OF THE EMBODIMENTS

Various exemplary embodiments, features, and aspects of the invention will be described in detail below with reference to the drawings.

In a description below, an auxiliary image refers to an image used to make it easy to turn pages when sheets are bound. The auxiliary image is usually printed using a clear (transparent) toner in order not to exert influence upon an image printed on a sheet. However, other color materials can be used.

Figure 20:
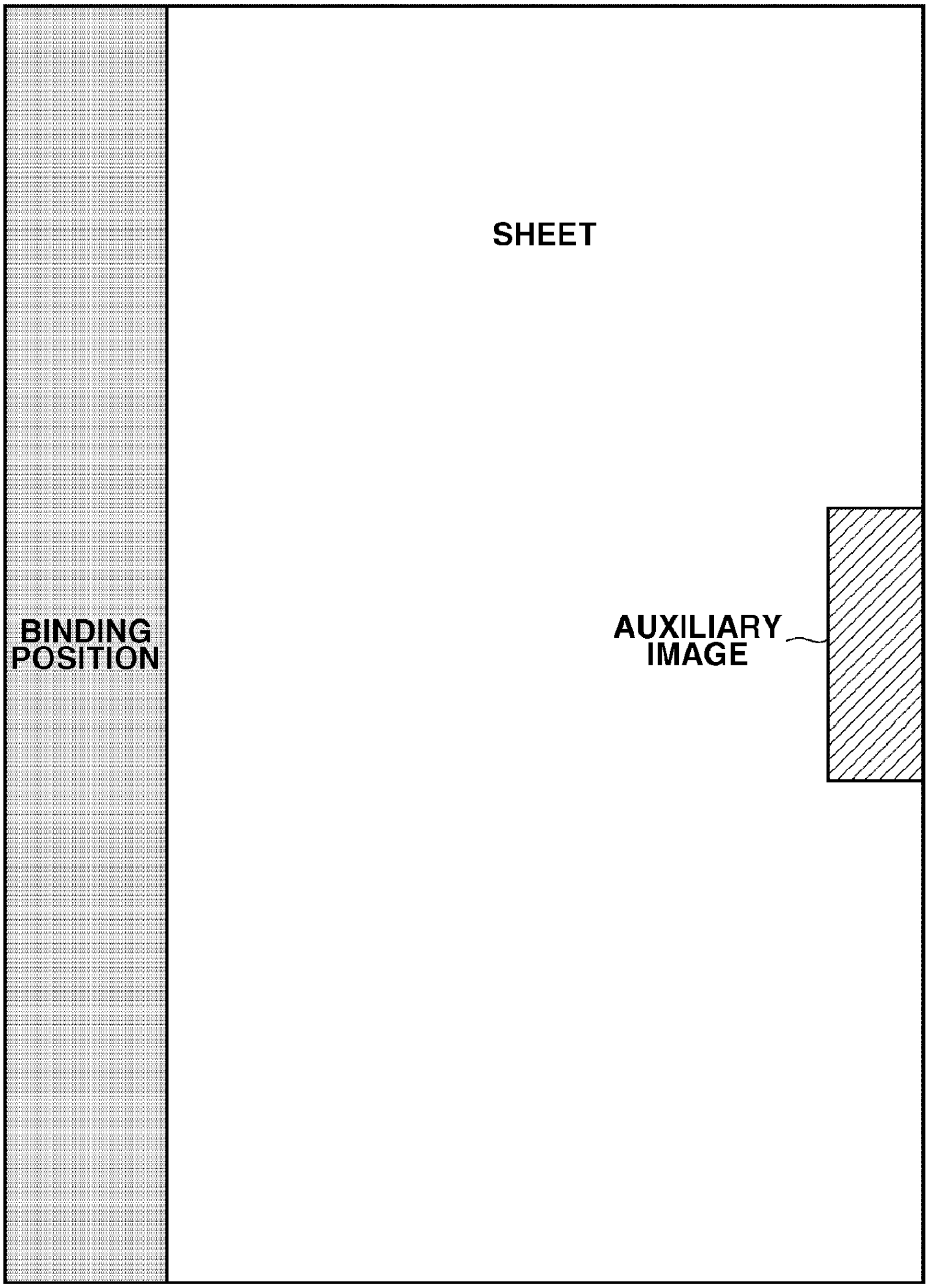
FIG. 20 illustrates a print product in which an auxiliary image is printed when viewed from the front.

FIG. 20 illustrates a print product on which an auxiliary image is printed when viewed from the front. In FIG. 20, an auxiliary image is printed at the center of an opposite side to a binding position of a bookbinding as a position used to turn bound sheets with fingers.

Figure 21:
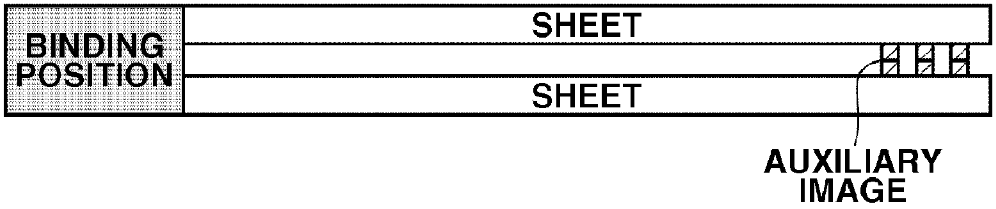
FIG. 21 illustrates a print product in which an auxiliary image is printed when viewed from the cross-section.

FIG. 21 illustrates a print product on which an auxiliary image is printed when viewed from the cross-section. A clearance (transparence) is secured between sheets by the auxiliary image. As a result, sticking of sheets due to electrostatic force can be prevented, and a reader can easily turn the sheet by putting the reader's fingers thereon. Further, in FIG. 20, resistance force at a portion on which an auxiliary image is printed increases. Therefore, a reader can turn sheets easily with friction between the reader's fingers and the sheet when turning the sheet.

Figure 1:
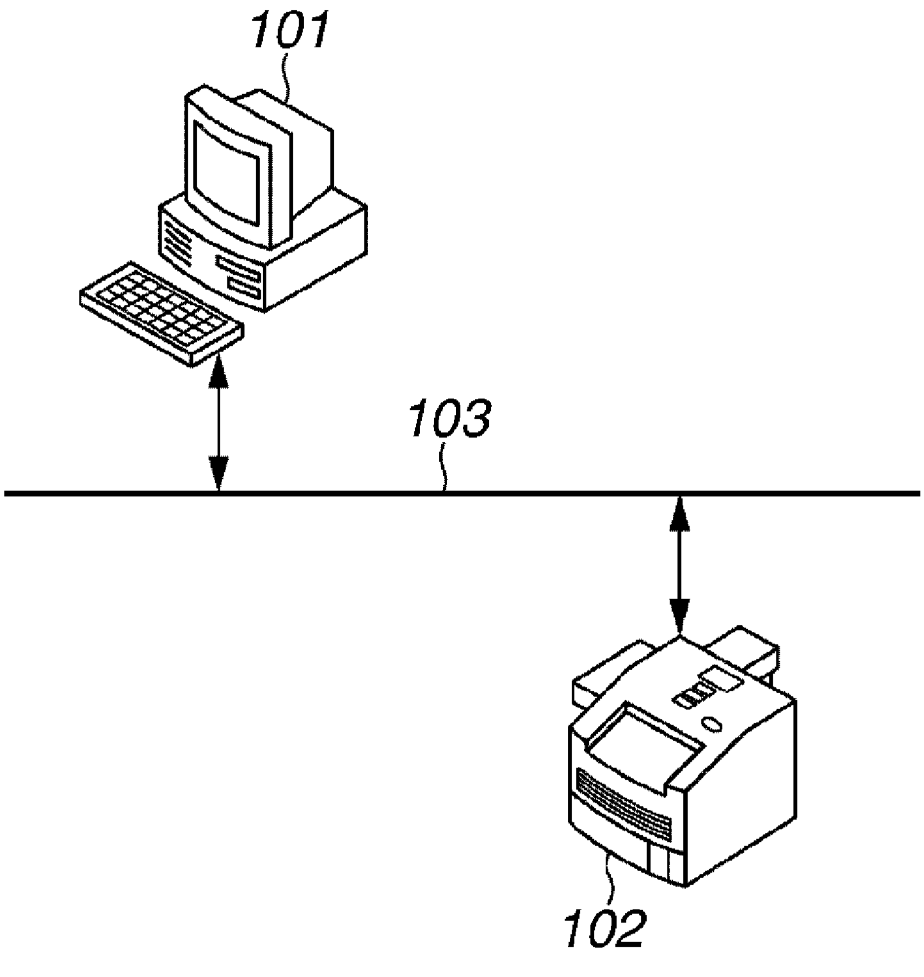
FIG. 1 illustrates a configuration of a system according to a first exemplary embodiment.

In a first exemplary embodiment, a print setting of an auxiliary image is performed on a personal computer (PC) when sending a job. FIG. 1 illustrates a configuration of a system according to the first exemplary embodiment. A PC 101 and a printer 102 are connected via a network 103, thereby performing a transmission of data such as image data or the like. In addition, a connection of the PC 101 and the printer 102 may be a local connection.

Figure 2:
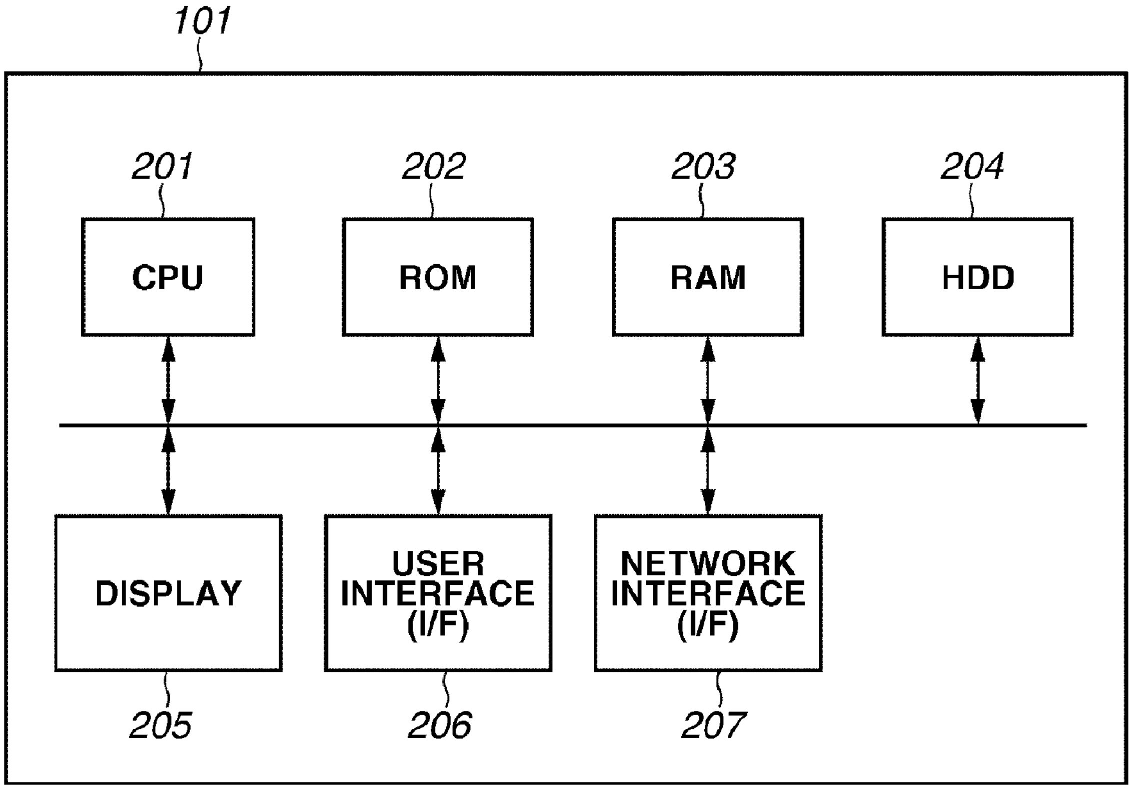
FIG. 2 is a block diagram illustrating a configuration of a personal computer (PC) according to the first exemplary embodiment.

FIG. 2 is a block diagram illustrating a configuration of the PC 101 according to the first exemplary embodiment. A central processing unit (CPU) 201 controls units within the PC 101 based on a program expanded on a random access memory (RAM) 203. A read-only memory (ROM) 202 (non-volatile storage medium) stores a boot program or the like executed by the CPU 201. In the RAM 203 (volatile storage medium), an operating system (OS) and an application program, and on the like that are executed by the CPU 201 are read out and expanded from a hard disk drive (HDD) 204. The HDD 204 (non-volatile storage medium) stores the OS and an application program, and the like that are executed by the CPU 201. A display 205 displays various items of information in the PC 101 to a user. A user interface 206 accepts various inputs from the user using a mouse and a keyboard, to the PC 101. A network interface 207 performs an input/output of image data from external apparatuses such as the printer 102.

Figure 3:
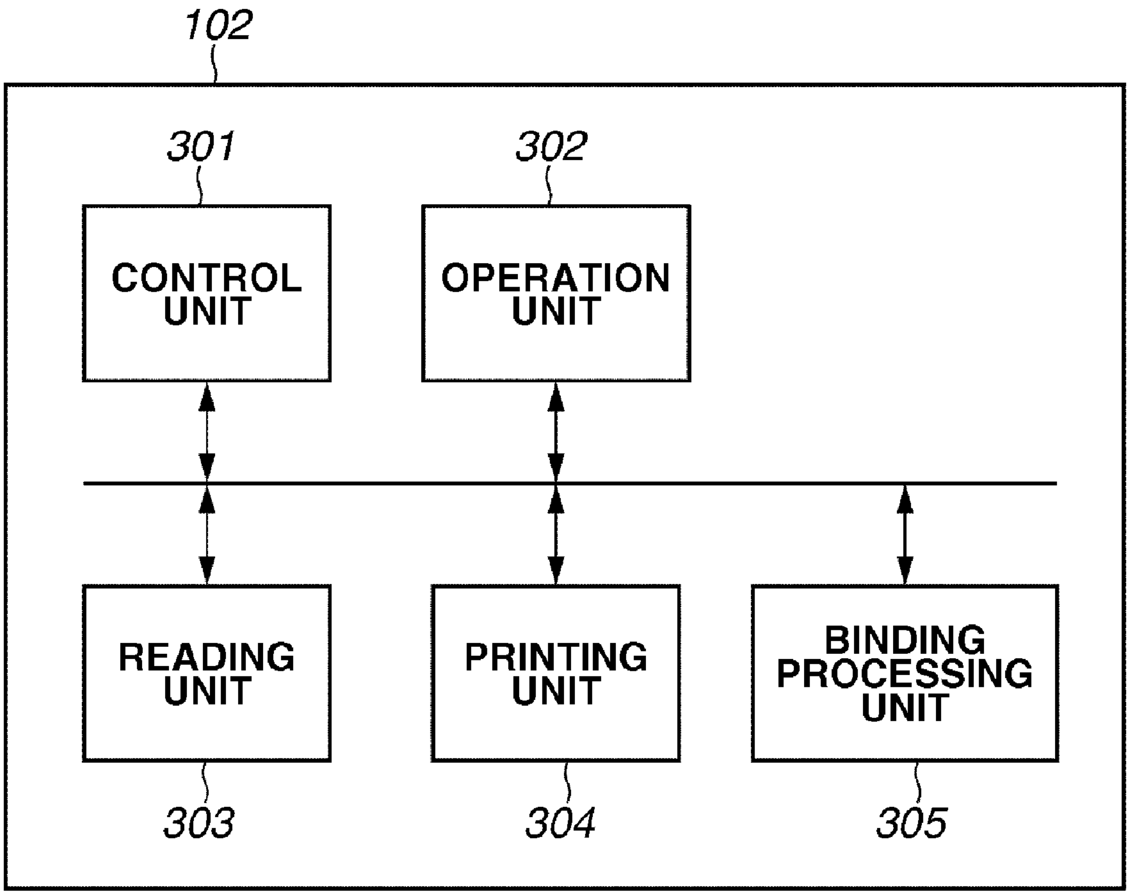
FIG. 3 is a block diagram illustrating a configuration of a printer according to the first exemplary embodiment.

FIG. 3 is a block diagram illustrating a configuration of a printer 102 according to the first exemplary embodiment. A control unit 301 controls units in the printer 102. The details of the control unit 301 will be described with reference to FIG. 4.

An operation unit 302 includes a display unit and an input unit. The display unit provides an operation screen for the printer 102 to the user, while the input unit accepts various operations for the printer 102 from the user.

A reading unit 303 reads image data from a document, and inputs the read image data into the control unit 301. A printing unit 304 forms an image on an output sheet based on image data on which the control unit 301 has executed an image processing.

A binding processing unit 305 executes a binding processing using a staple or the like to a plurality of sheets printed by the printing unit 304. In this regard, the binding processing unit 305 may be a separate device that is detachably attached to the printer 102. Further, the binding processing unit 305 may execute a binding processing in an off-line state, while it is not installed in the printer 102.

Figure 4:
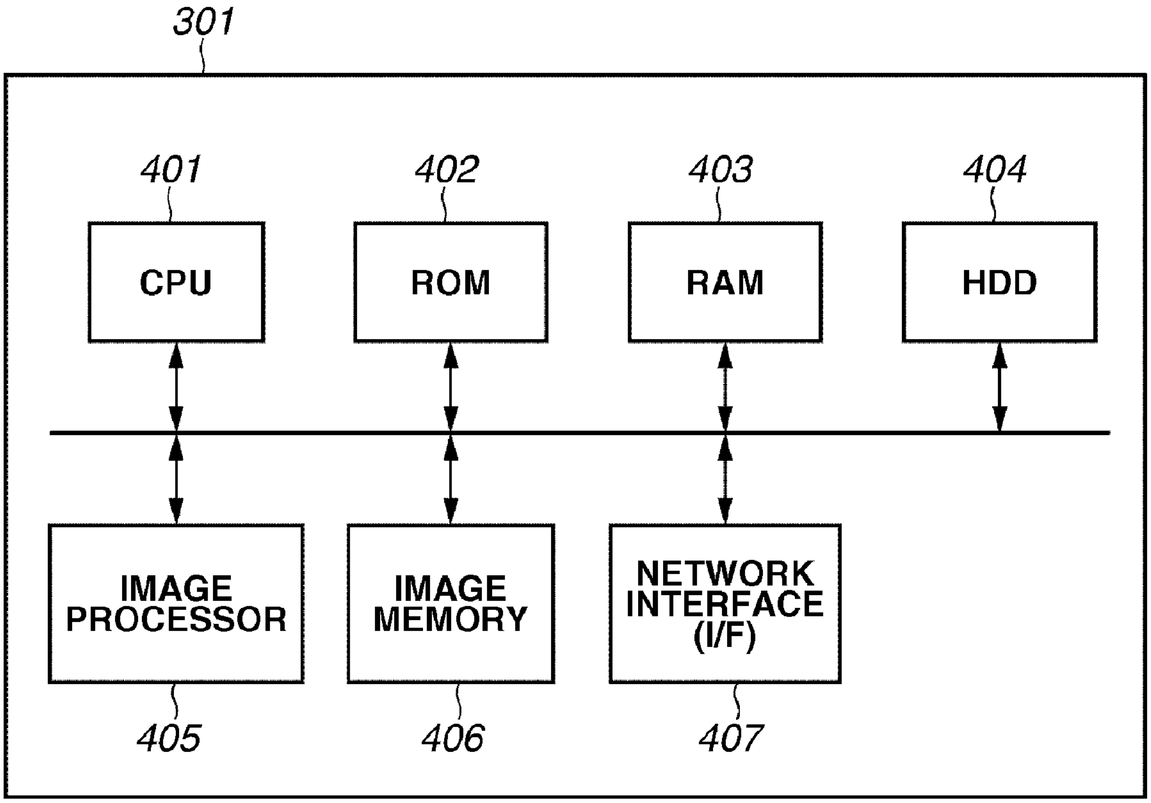
FIG. 4 is a block diagram illustrating a detail of a control unit according to the first exemplary embodiment.

FIG. 4 is a block diagram illustrating the details of the control unit 301 according to the first exemplary embodiment. A CPU 401 controls respective components 302 to 304 of the printer 102 and respective components 402 to 407 of the printer control unit 301 based on a program expanded on a RAM 403.

A ROM 402 (non-volatile storage medium) stores a boot program and the like executed by the CPU 401. The RAM 403 (volatile storage medium) stores an OS and an application program and the like executed by the CPU 401, which are read and expanded from a HDD 404.

The HDD 404 (non-volatile storage medium) stores the OS and an application program and the like executed by the CPU 401. An image processor 405 executes various image processing with respect to image data stored in an image memory 406.

An image memory 406 (volatile storage medium) temporarily holds image data that is input from the reading unit 303 and a network interface 407. A network interface 407 performs an input/output of image data and the like from external apparatuses such as the PC 101.

Figure 5:
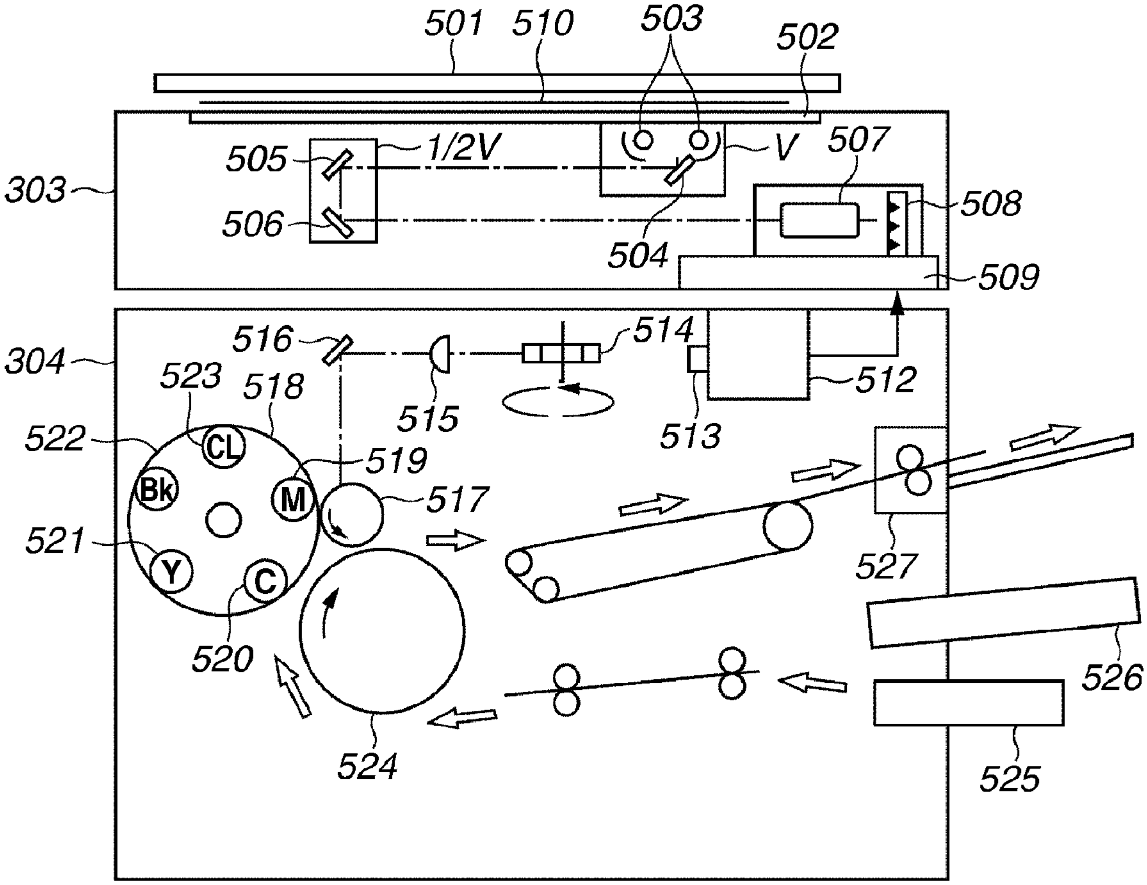
FIG. 5 is a cross-sectional view illustrating a configuration of a printer according to the first exemplary embodiment.

FIG. 5 is a cross-sectional view illustrating a configuration of the printer 102 according to the first exemplary embodiment. FIG. 5 illustrates configurations of the reading unit 303 and the printing unit 304, out of a configuration of the printer 102. The reading unit 303 includes a mirror surface pressing plate 501, a document positioning glass plate 502, a lamp 503, mirrors 504, 505 and 506, a lens 507, a three-line charge-coupled device (CCD) 508, and a data processing unit 509.

The lamp 503 irradiates light on a document 510 placed on the document positioning glass plate 502. The mirrors 504, 505, and 506 direct the reflected light from the document 510 to the lens 507. The lens 507 focuses light received from the mirror 506 on the CCD 508 to form an image.

The CCD 508 photoelectrically converts the contrast of the formed image into an amount of electric charge. The CCD 508 then sequentially reads out the electric charge, converts the electric charge into electric signals, and outputs the electric signals to the data processing unit 509. The electric signals, which are output from the CCD 508, are RGB signals which are decomposed into three colors: red (R), green (G), blue (B).

The lamp 503 and the mirror 504 move mechanically in a direction vertical to main scanning (electric scanning) direction of the CCD 508 at a velocity v. The mirror 505 and the mirror 506 move similarly at a velocity ½ v. Thereby, the CCD 508 performs sub-scanning of the whole surface of a document. The document 510 is read, and the read image signal data (RGB signals) is stored in the memory located inside the data processing unit 509 by a unit of one page of a document.

The data processing unit 509 processes for each pixel the data of image signals (RGB signals) stored in the memory. More specifically, the data processing unit 509 converts pixel data into color components of cyan (C), magenta (M), yellow (Y), black (K), and outputs the converted image data to the printing unit 304.

Further, the data processing unit 509 generates a color component of transparent (CL; Clear) for each pixel, and outputs it to the printing unit 304. That is, the data processing unit 509 outputs image signals consisting of color components of C, M, Y, K, and CL to the printing unit 304.

The printing unit 304 includes a laser driver 512, a semiconductor laser 513, a polygonal mirror 514, a f-θ lens 515, a mirror 516, a photosensitive drum 517, and a rotatable developing unit 518. The rotatable developing unit 518 includes a magenta development section 519, a cyan development section 520, a yellow development section 521, a black development section 522, and a clear (transparent) development section 523. Further, the printing unit 304 includes a transfer drum 524, sheet cassettes 525 and 526, and a fixing unit 527.

The laser driver 512 receives an image signal consisting of color components of C, M, Y, K, and CL, and modulates and drives a semiconductor laser 513 according to the image signal. A laser beam emitted from the semiconductor laser 513 scans a photosensitive drum 517 via the polygonal mirror 514, the f-θ lens 515, and the mirror 516. Thereby, an electrostatic latent image is formed on the photosensitive drum 517.

The rotation type developing unit 518 includes the magenta development section 519, the cyan development section 520, the yellow development section 521, the black development section 522, and the clear (transparent) development section 523. Each development section sequentially contacts the photosensitive drum 517, and develops electrostatic latent images formed on the photosensitive drum 517. In addition, in the present exemplary embodiment, C, M, Y, K, and CL are configured by a drum, but may be configured by separate dedicated drums for each color.

The transfer drum 524 is wrapped around by a sheet supplied from the sheet cassettes 525 and 526, to transfer developed electrostatic latent images on the sheet. Toners of five colors of C, M, Y, K, and CL are transferred in sequence on the sheet, then a fixing unit 527 fixes transferred toners on the sheet. After that, the sheet is discharged.

Figure 6:
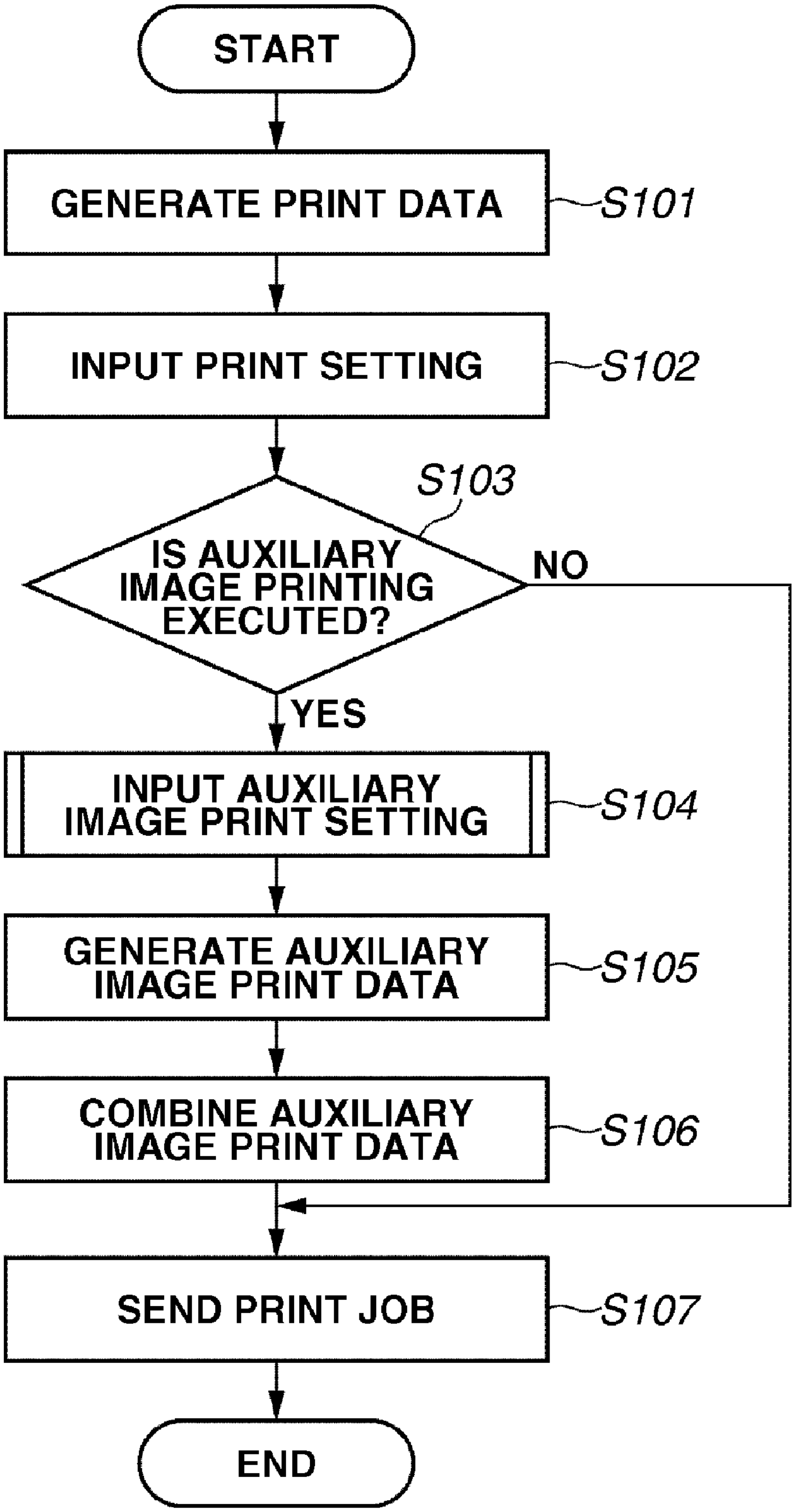
FIG. 6 is a flowchart illustrating an operation of the PC according to the first exemplary embodiment.

FIG. 6 is a flowchart illustrating an operation of the PC 101 according to the first exemplary embodiment. The operation illustrated in the flowchart is implemented by causing the CPU 201 to read out to the RAM 203 and execute a program stored in the HDD 204.

First, in step in S101, the CPU 201 generates print data. The print data is generated by causing the CPU 201 to read out application software stored in the HDD 204 to the RAM 203 and execute it. The application software may be, for example, document creation software, spreadsheet software, presentation software, and rendering software.

Next, in step S102, the CPU 201 accepts an input of a print setting from a user for the print data generated in step S101. The print setting is executed by displaying a UI screen illustrated in FIG. 9 on a display 205, and accepting an input from the user using a user interface 206. In the UI screen illustrated in FIG. 9, a normal print setting (bookbinding type/binding position/print direction/open direction, etc.) as well as whether to execute a printing of an auxiliary image can be set.

As a bookbinding type, case binding/saddle stitching bookbinding/staple are selectably displayed. As a binding position, right side/left side/upper side/bottom side for a bookbinding type of case binding or saddle stitching bookbinding, while upper left corner/upper right corner/lower left corner/lower right corner for a bookbinding type of staple, are selectably displayed.

As a printing direction, vertical/horizontal are selectably displayed. As an open direction, rightward/leftward/upward/downward are selectably displayed.

Next, in step S103, the CPU 201 determines whether an auxiliary image printing is to be executed for the print data generated in step S101. The determination is made depending on whether a setting to execute an auxiliary image printing has been set in step S102.

In step S103, if it is determined that an auxiliary image printing is to be executed (YES in step S103), then the process advances to S104. If it is determined that an auxiliary image printing is not to be executed in step S103 (NO in step S103), then the process advances to step S107.

Next, in step S104, the CPU 201 accepts an input of a print setting of an auxiliary image from a user for print data generated in step S101. A detail of a print setting of the auxiliary image will be described below with reference to FIG. 7.

Next, in step S105, the CPU 201 generates image data of the auxiliary image based on the print setting of the auxiliary image accepted in step S104. Next, in step S106, the CPU 201 combines the print data generated in step S101 with the image data of the auxiliary image generated in step S105.

In the combination processing, when a color of the auxiliary image is designated as transparent in step S203, information is added, which indicate that a portion of transparent color should be printed using a clear (transparent) toner, not normal toners of CMYK. Next, in step S107, the CPU 201 sends the print data combined in step S106 and the print setting received in step S102 as a print job to the printer 102.

Figure 7:
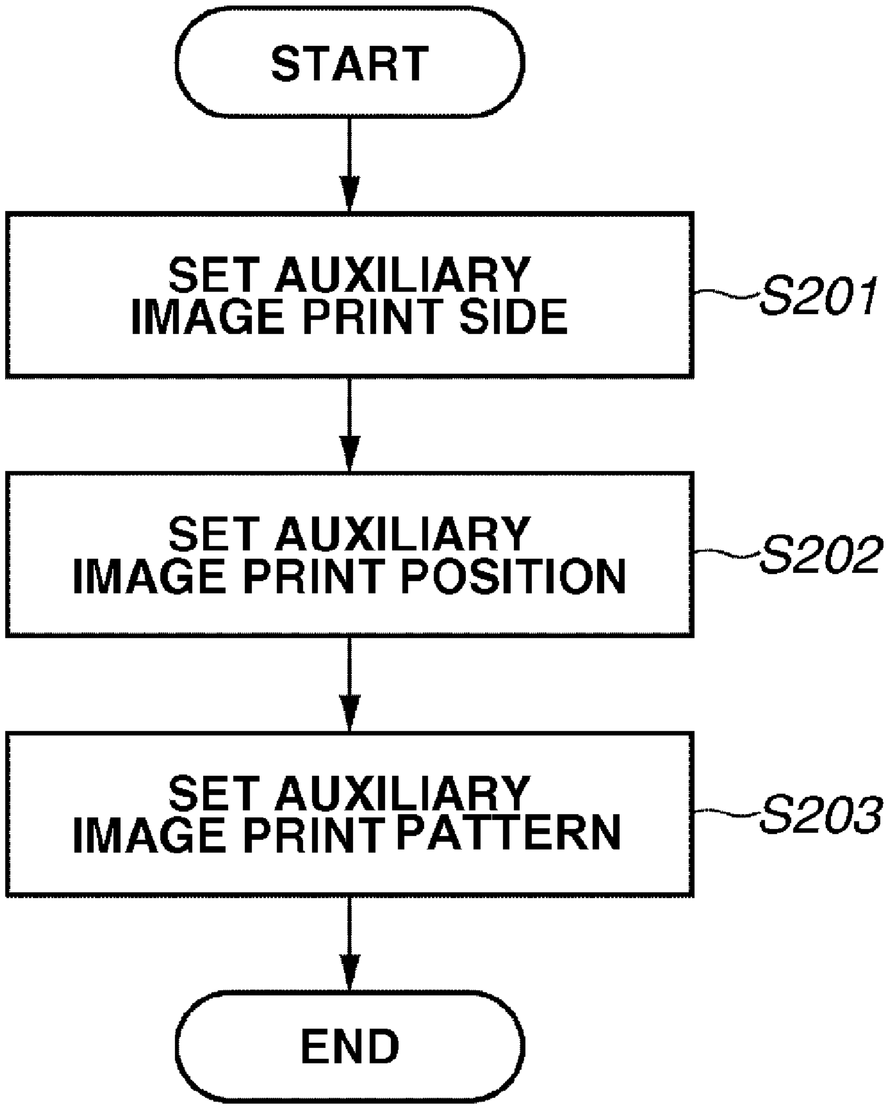
FIG. 7 is a flowchart illustrating a detail of a print setting of an auxiliary image according to the first exemplary embodiment.

FIG. 7 is a flowchart illustrating a detail of a print setting of an auxiliary image illustrated in S104 in FIG. 6 according to the first exemplary embodiment. In addition, an operation illustrated in the flowchart is implemented by causing the CPU 201 to read out and execute a program stored in the HDD 204 to the RAM 203. Further, a print setting of the auxiliary image is executed by displaying UI screens illustrated in FIG. 10 to FIG. 12 on the display 205, and accepting an input from a user using a user interface 206.

Figure 10:
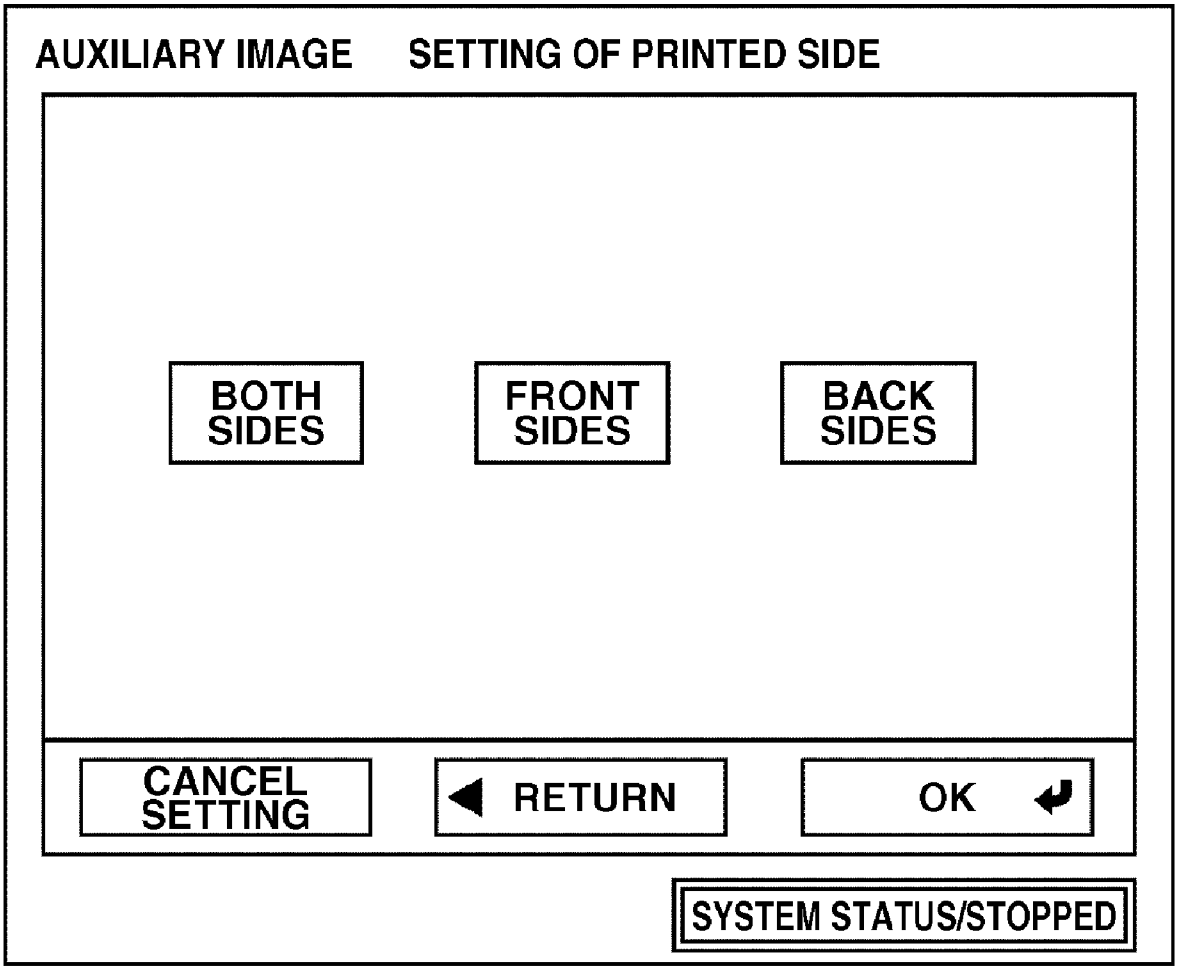
FIG. 10 is an example of a UI screen displayed in a setting of a print side according to the first exemplary embodiment.

First, in step S201, the CPU 201 accepts from a user an input of a printing side setting that the auxiliary image printing executes. FIG. 10 illustrates an example of a UI screen displayed on the display 205 in step S201. In FIG. 10, it is possible to select a printing side for executing an auxiliary image printing using icons that indicate both sides/front side/back side, respectively.

Figure 11:
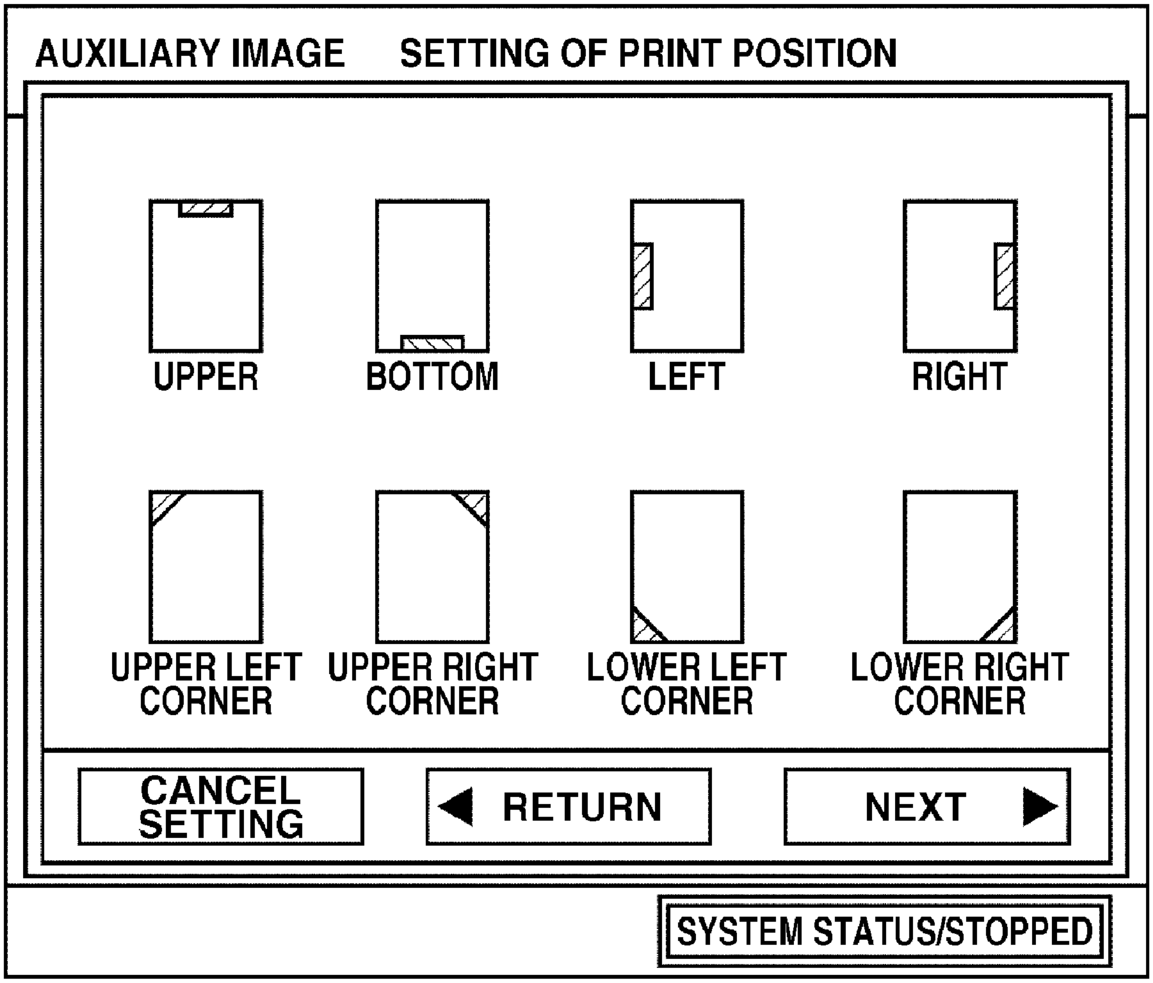
FIG. 11 is an example of a UI screen displayed in a setting of a printing position according to the first exemplary embodiment.

Next, in step S202, the CPU 201 receives from a user an input of a printing position setting to execute an auxiliary image printing. FIG. 11 is an example of a UI screen displayed on the display 205 in step S202. In FIG. 11, a printing position to execute an auxiliary image printing can be selected from among icons representing upper/bottom/left/right/upper left corner/upper right corner/lower left corner/lower right corner.

All of these icons may be selectably displayed. However, candidates of printing positions may be determined according to a print setting, and icons representing candidates of the determined printing positions may be selectably displayed. At this time, icons other than icons representing the determined candidates of printing positions may be displayed non-selectably (grayed out or the like). A method for determining candidates of printing positions of an auxiliary printing image according to a print setting will be described below with reference to FIG. 19.

Figure 19:
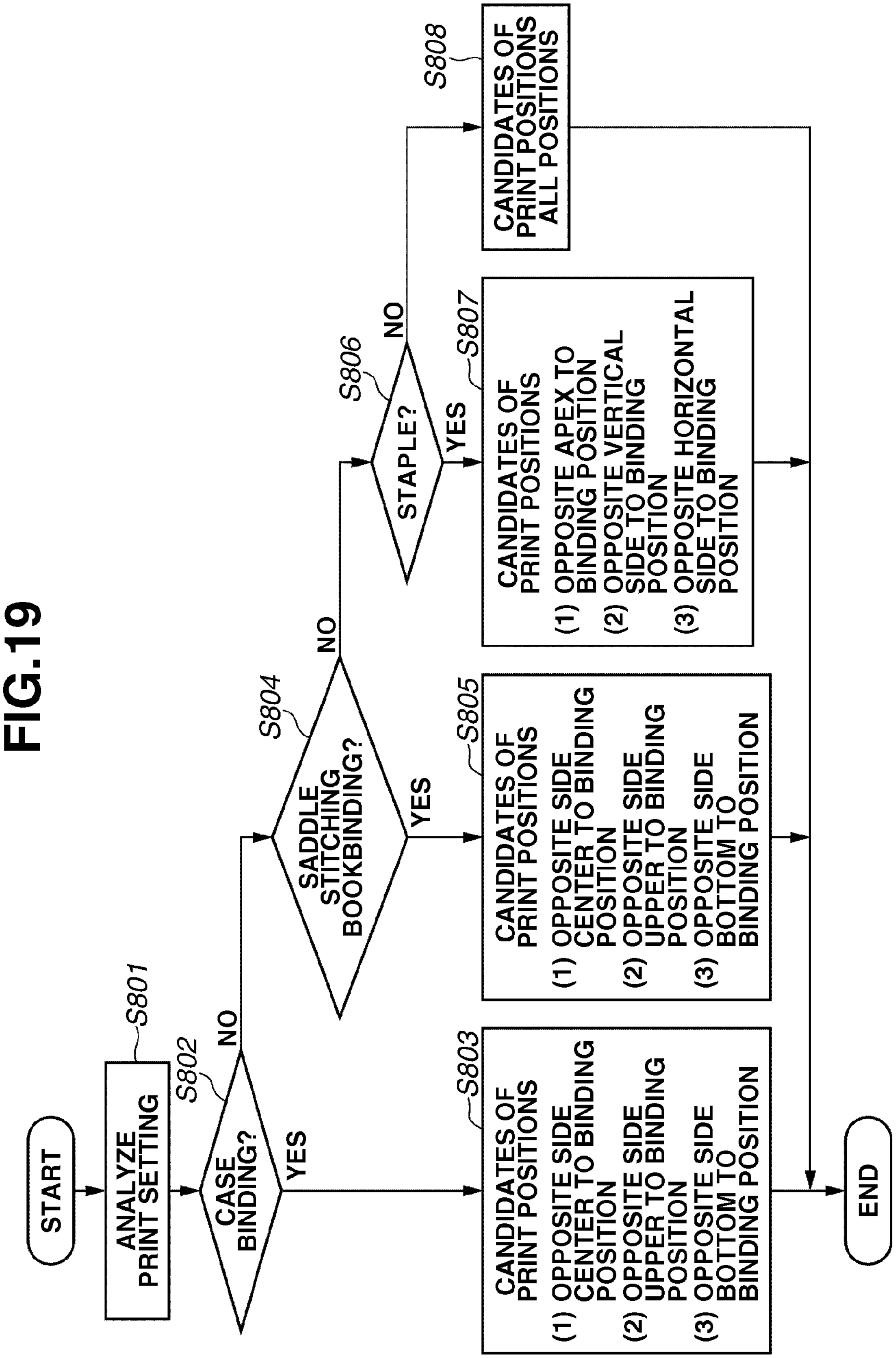
FIG. 19 is a flowchart illustrating a method for determining candidates of printing positions of auxiliary images depending on print settings in settings of printing positions of auxiliary images according to the first exemplary embodiment.

FIG. 19 is a flowchart illustrating a method for determining candidates of printing positions of an auxiliary printing image according to a print setting, according to the first exemplary embodiment of a printing position setting of an auxiliary image in step S202. In addition, an operation illustrated in the flowchart is implemented by causing the CPU 201 to read a program stored in the HDD 204 to the RAM 203 and execute it.

First, in step S801, the CPU 201 analyzes a print setting that is set in step S102. Next, in step S802, the CPU 201 determines whether a bookbinding type is set to case binding, in the print setting analyzed in step S801.

If it is determined that a bookbinding type is set to the case binding in step S802 (YES in step S802), then the process advances to step S803. If it is determined that a bookbinding type is not set to the case binding in step S802 (NO in step S802), then the process advances to step S804.

If it is determined that a bookbinding type is set to case binding in step S802 (YES in step S802), then in step S803, the CPU 201 determines portions of opposite side center and upper and bottom to a binding position in a print setting analyzed in step S801 as candidates of printing positions of an auxiliary image.

In other words, when a particular side is input as a binding position of a sheet, at least one position from among the upper portion, bottom portion, and center portion in the opposite side of the binding position are determined as candidates of printing position of an auxiliary image. In this case, for example, when a binding position is left, then in FIG. 11, right corner, upper right corner, and lower right corner are determined as candidates of printing positions of the auxiliary image.

If it is determined that a bookbinding type is not set to a case binding in step S802 (NO in step S802), then in step S804, the CPU 201 determines whether a bookbinding type is set to a saddle stitching bookbinding in the print setting analyzed in step S801.

If it is determined that a bookbinding type is set to a saddle stitching bookbinding in step S804 (YES in step S804), then the process advances to step S805. If it is determined that a bookbinding type is not set to a saddle stitching bookbinding in step S804 (NO in step S804), then the process advances to step S806.

If it is determined that a bookbinding type is set to a saddle stitching bookbinding in step S804 (YES in step S804), then in step S805, the CPU 201 determines center, upper, and bottom of the opposite side of the binding position in the print setting analyzed in step S801 as candidates of printing positions of the auxiliary image. In other words, when a particular side is input as a binding position of sheets, at least one or more portions from among the upper, the lower, and the center in the opposite side of the binding position of the sheets are determined as candidates of the printing positions of the auxiliary image. In this case, for example, in FIG. 11, when a binding position is left side, then right corner, upper right corner, and lower right corner are determined as candidates of the printing positions of the auxiliary image.

If it is determined that a bookbinding type is not set to a saddle stitching bookbinding in step S804 (NO in step S804), then in step S806, the CPU 201 determines whether a bookbinding type is set to a staple in the print setting analyzed in step S801. If it is determined that a bookbinding type is set to a staple in step S806 (YES in step S806), then the process advances to step S807. If it is determined that a bookbinding type is not set to a staple in step S806 (NO in step S806), then the process advances to step S808.

If it is determined that a bookbinding type is set to a staple in step S806 (YES in step S806), then in step S807, the CPU 201 determines an opposite apex and a vertical side center and a horizontal side center that forms opposite corner to the binding position in the print setting analyzed in step S801 as candidates of printing position of the auxiliary image. In other words, when a particular apex is input as a binding position of sheets, at least one or more portions from among portions of an opposite apex to the binding position of the sheets and a center of a side that forms an opposite corner to the binding position of the sheets are determined as candidates of printing positions of the auxiliary image. In this case, for example, in FIG. 11, when a binding position is upper left corner, then lower right corner, right corner, and bottom are determined as candidates of the printing positions of the auxiliary image.

If it is determined that a bookbinding type is not set to a staple in step S806 (NO in step S806), then in step S808, the CPU 201 determines all positions as candidates of the printing positions of the auxiliary image. In this case, for example, in FIG. 11, upper, bottom, left, right, upper left corner, upper right corner, lower left corner, and lower right corner are determined as candidates of the printing positions of the auxiliary image.

Figure 12:
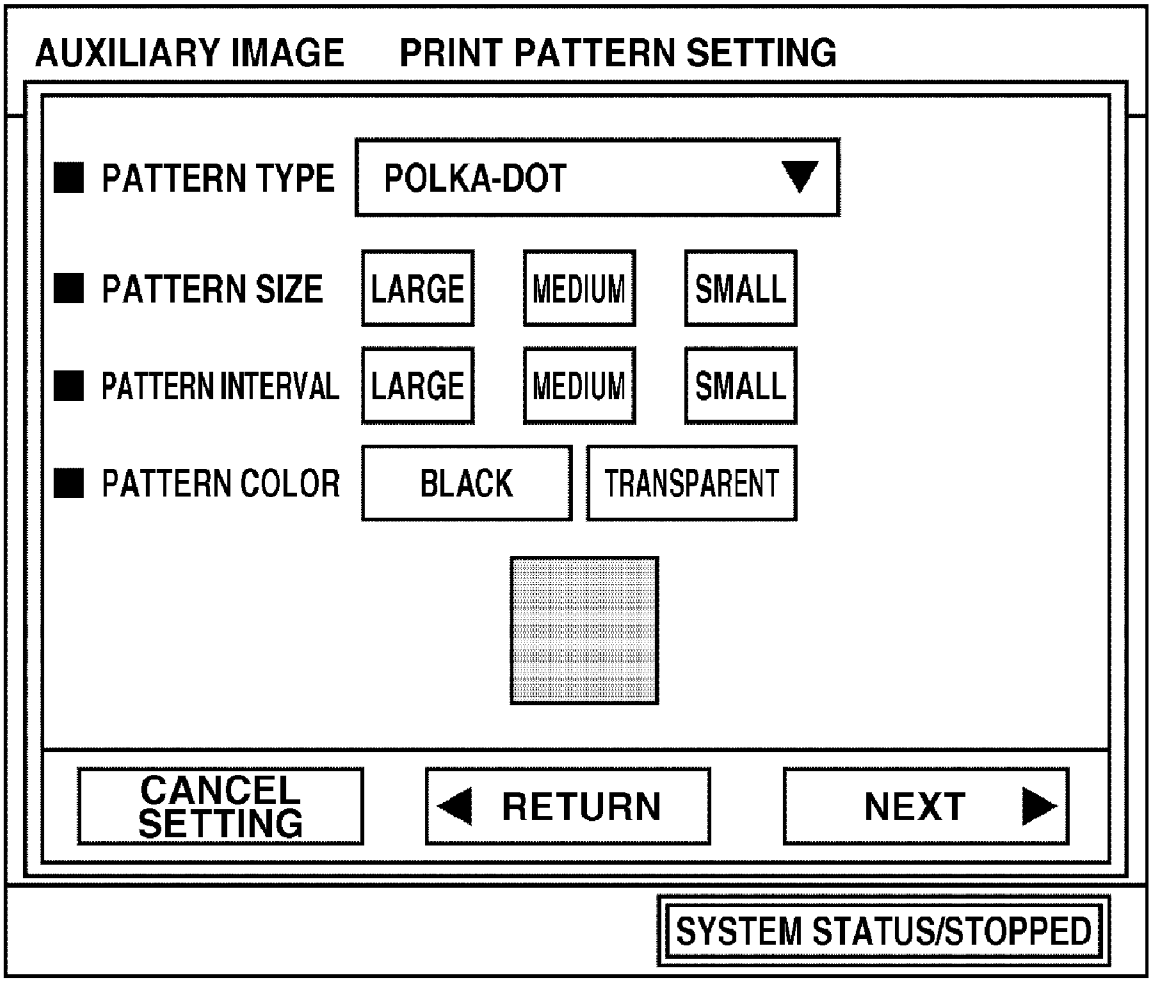
FIG. 12 is an example of a UI screen displayed in a setting of a print pattern according to the first exemplary embodiment.

Next, in step S203, the CPU 201 accepts from a user an input of print pattern setting to execute an auxiliary image printing. FIG. 12 illustrates an example of a UI screen to be displayed on the display 205 in step S203.

In FIG. 12, pattern type/pattern size/pattern interval/pattern colors can be selected. As a pattern type, for example, polka dot/stripe are available. As a pattern size and pattern interval, for example, large/medium/small are available. As a pattern color, for example, black/transparent are available. When transparent is selected as a pattern color, a printing of the auxiliary image is executed using a clear (transparent) toner.

Figure 8:
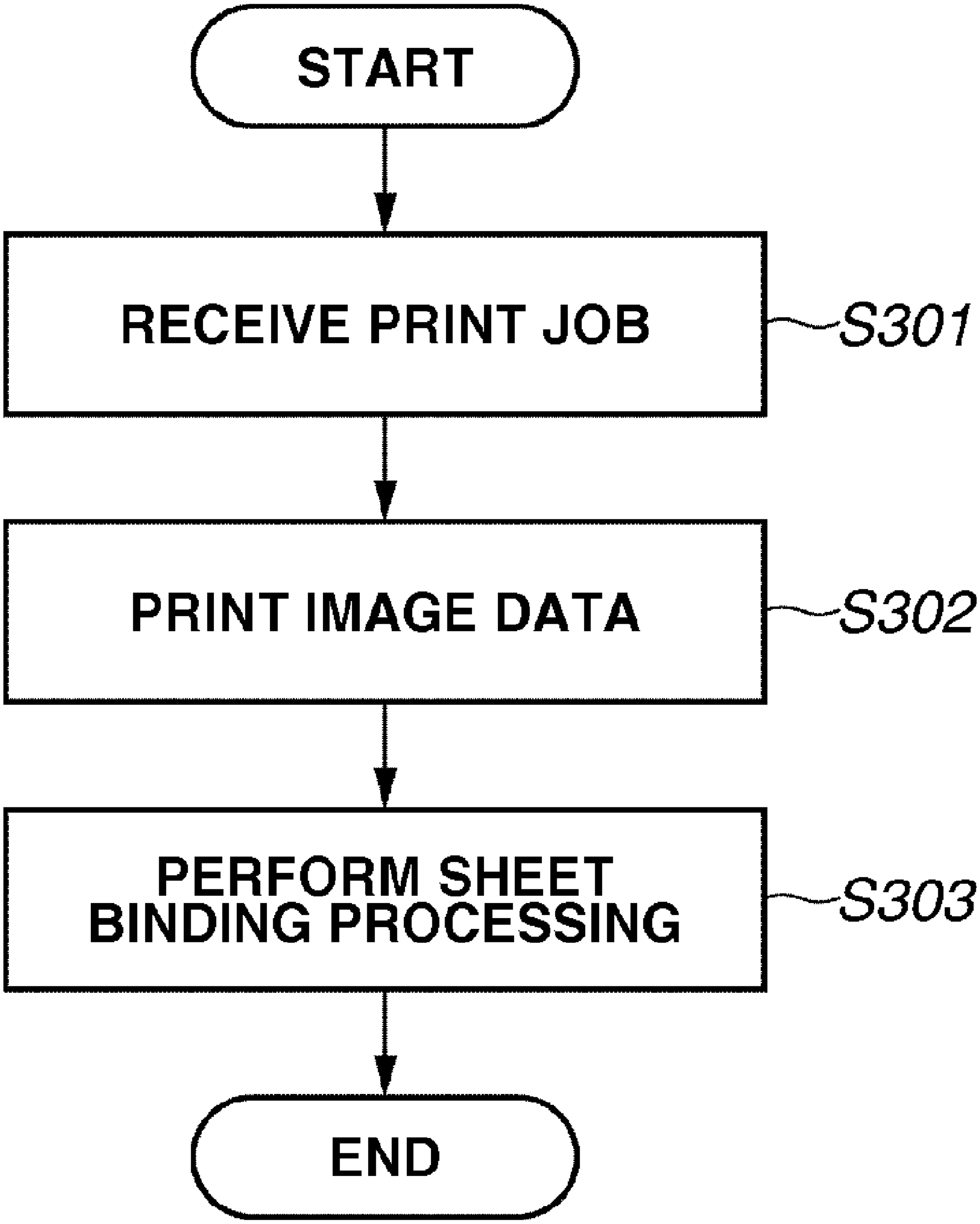
FIG. 8 is a flowchart illustrating an operation of the printer according to the first exemplary embodiment.

FIG. 8 is a flowchart illustrating an operation of the printer 102 according to the first exemplary embodiment. An operation illustrated in the flowchart is implemented by causing the CPU 401 to read a program stored in HDD 404 to the RAM 403 and execute it.

First, in step S301, the CPU 401 receives print data combined in step S106 and print setting accepted in step S102 from the PC 101 as a print job. Next, in step S302, print data received in step S301 is printed by the printing unit 304 based on a print setting received in step S301.

In the printing, when a color of the auxiliary image is designated as transparent in step S203 based on the information added in step S106, a portion of transparent color is printed using a clear (transparent) toner, not normal CMYK toners.

Next, in step S303, a binding processing unit 305 executes a binding processing based on a print setting that is set in step S102 for the sheets printed in step S302. The binding processing may be executed by other apparatuses, not by the printer 102.

In addition, a printing of the auxiliary image is preferably executed using a clear (transparent) toner so as not to exert influence on a print image, but which may be executed using colors (CMYK) used for usual printing. Further, when the clear (transparent) toner is printed on the whole surface of a sheet, the auxiliary image printing may not be executed.

In the first exemplary embodiment, the process in step S104 is executed on the PC 101 side, however, it may be executed on the printer 102 side. According to the first exemplary embodiment, a printing position of the auxiliary image can be easily set. Further, according to the first exemplary embodiment, the auxiliary image printing can be executed without performing a print setting of the auxiliary image on the printer side.

In a second exemplary embodiment, a print setting of an auxiliary image is registered on the printer side. The printer, when a job is input that agrees with print conditions included in the auxiliary image print setting, executes an auxiliary image printing based on a print setting of the auxiliary image. The configurations of the apparatus according to a second exemplary embodiment are similar to those illustrated in the first exemplary embodiment as described previously with reference to FIG. 1 to FIG. 5, and accordingly descriptions thereof are not repeated.

Figure 13:
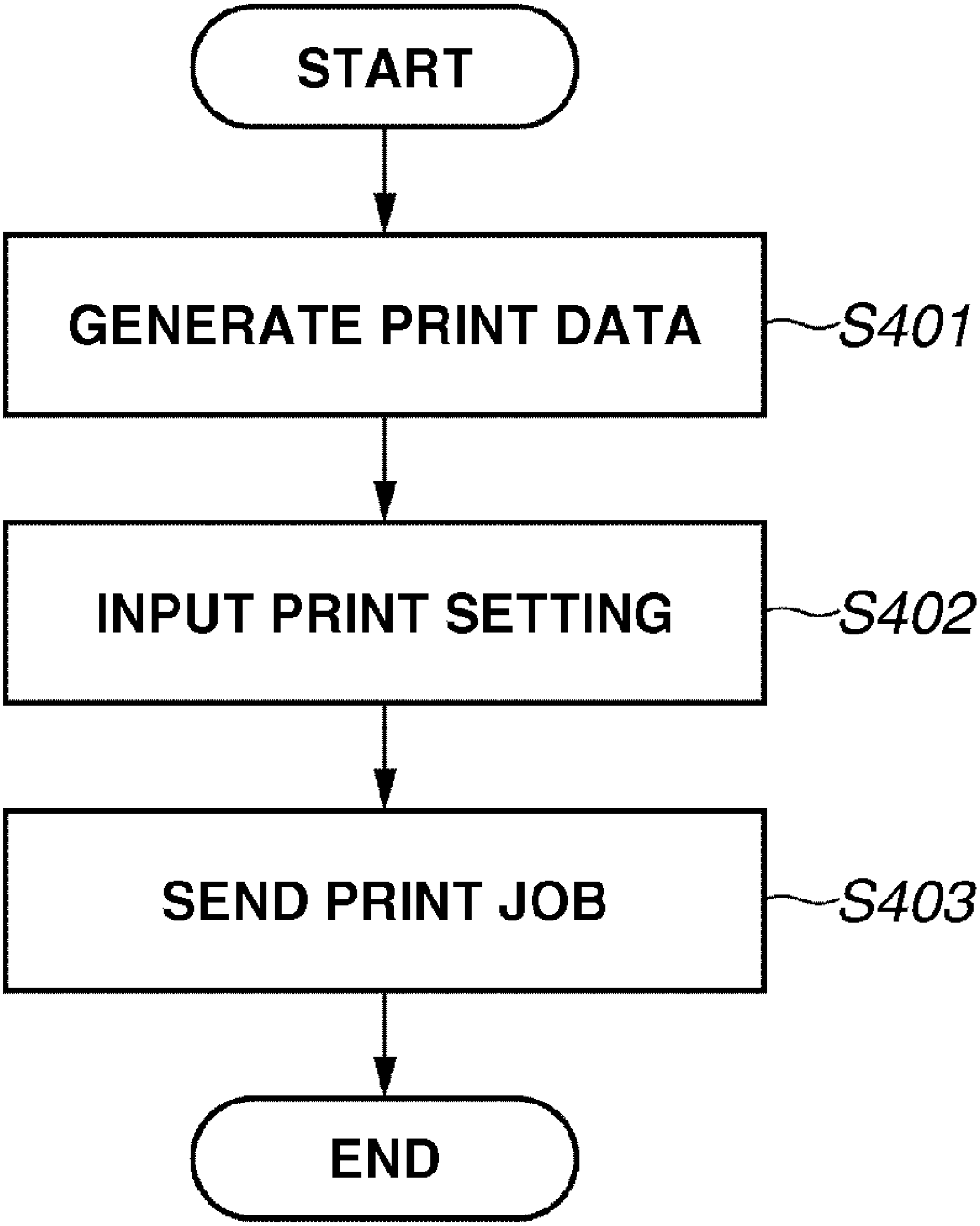
FIG. 13 is a flowchart illustrating an operation of a PC according to a second exemplary embodiment.

FIG. 13 is a flowchart illustrating an operation of the PC 101 according to the second exemplary embodiment. The operation illustrated in the flowchart is implemented by causing the CPU 201 to read a program stored in the HDD 204 to the RAM 203 and execute it.

First, in step S401, the CPU 201 generates print data. The print data is generated by causing the CPU 201 to read application software stored in the HDD 204 to the RAM 203 and execute it. The application software includes, for example, document creation software, spreadsheet software, presentation software, and rendering software.

Next, in step S402, the CPU 201 accepts from a user an input of print setting for print data generated in step S101. The print setting is executed by displaying a UI screen illustrated in FIG. 9 on the display 205, and accepting the input from the user using a user interface 206.

Figure 9:
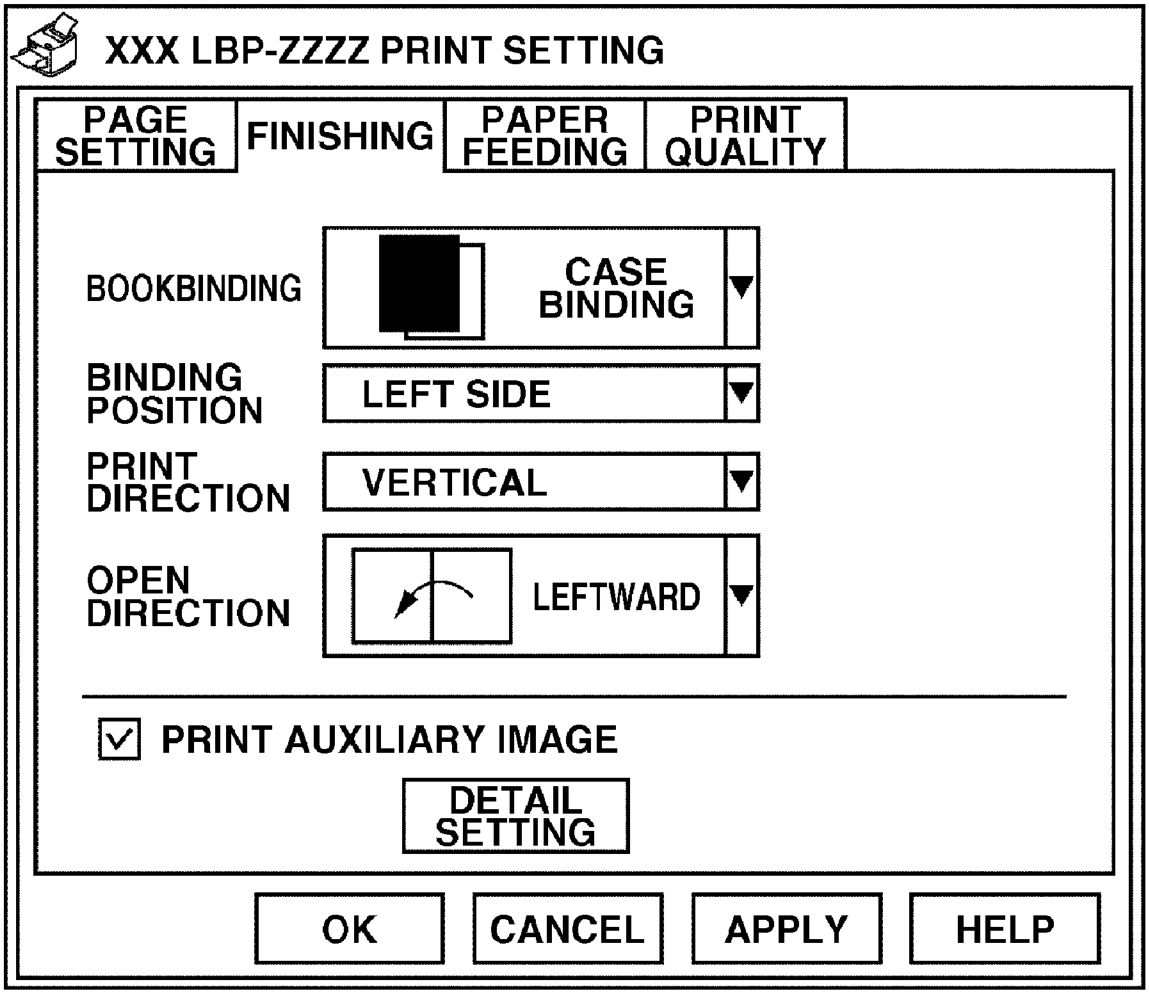
FIG. 9 is an example of a user interface (UI) screen displayed in a print setting according to the first exemplary embodiment.

On the UI screen illustrated in FIG. 9, normal print setting (bookbinding type/print direction/open direction and the like) as well as whether to execute an auxiliary image printing can be set. Next, in step S403, the CPU 201 sends the print data generated in step S401 and the print setting accepted in step S402 as a print job to the printer 102.

Figure 14:
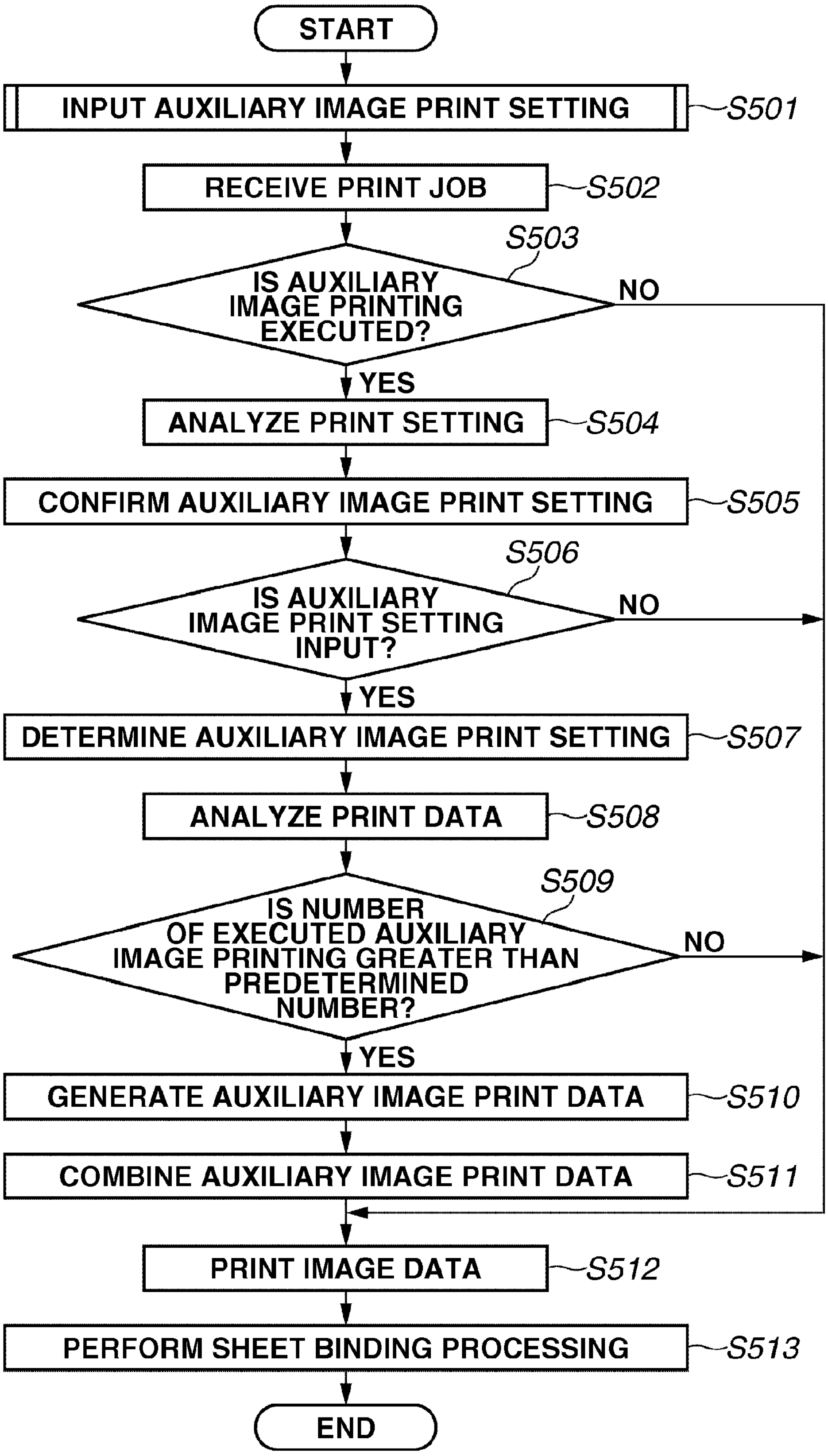
FIG. 14 is a flowchart illustrating an operation of a printer according to the second exemplary embodiment.

FIG. 14 is a flowchart illustrating an operation of the printer 102 according to the second exemplary embodiment. In addition, an operation illustrated in the flowchart is implemented by causing the CPU 401 to read a program stored in the HDD 404 to the RAM 403 and execute it.

First, in step S501, the CPU 201 accepts from a user an input of a print setting of an auxiliary image for the print data received in step S501. A detail of print setting of the auxiliary image will be described below with reference to FIG. 15. In addition, when a print setting of the auxiliary image has been already input, the process in step S501 can be omitted.

Next, in step S502, the CPU 201 receives the print data generated in step S401 and the print setting accepted in step S402 as a print job from the PC 101. Next, in step S503, the CPU 201 determines whether to execute an auxiliary image printing for the print data received in step S502. It is determined based on whether a setting to allow execution of an auxiliary image printing is set to be valid in advance on the printer 102.

If it is determined to execute an auxiliary image printing in step S503 (YES in step S503), then the process advances to step S504. If it is determined that the auxiliary image printing is not executed in step S503 (NO in step S503), then the process advances to S512.

Next, in step S504, the CPU 201 analyzes the print setting received in step S502. Next, in step S505, the CPU 201 confirms the auxiliary image print setting set in step S501. Next, in step S506, the CPU 201 determine whether an auxiliary image print setting having print condition that agrees with the print setting analyzed in step S504 is present in the auxiliary image print settings confirmed in step S505.

In step S506, if it is determined that an auxiliary image print setting having a print condition that agrees with the print setting analyzed in step S504 is present in the auxiliary image print settings confirmed in step S505 (YES in step S506), then the process advances to step S507. In step S506, if it is determined that an auxiliary image print setting having a print condition that agrees with the print setting analyzed in step S504 is not present in the auxiliary image print settings confirmed in step S505 (NO in step S506), then the process advances to step S512.

Next, in step S507, the CPU 201 determines an auxiliary image print setting having a print condition that agrees with the print setting analyzed in step S504 out of the auxiliary image print settings confirmed in step S505 as an auxiliary image print setting to be used. In other words, the CPU 201 selects an auxiliary image printing position corresponding to the determined binding position of sheets, from among the registered auxiliary image printing positions.

Next, in step S508, the CPU 201 analyzes the print data received in step S502. Next, in step S509, the CPU 201 determines whether the number of pages of print data analyzed in step S508 is equal to or more than the number of sheets of print execution of the auxiliary image print setting determined as an auxiliary image print setting for use in step S507. In other words, the CPU 201 determines whether the number of sheets to be performed printing is equal to or more than a predetermined number of sheets.

In S509, if it is determined that the number of pages of print data analyzed in step S508 is equal to or more than the number of sheets of print execution of the auxiliary image print setting determined as an auxiliary image print setting for use in step S507 (YES in step S509), then the process advances to step S510. In step S509, if it is determined that the number of pages of print data analyzed in step S508 is not equal to or more than the number of sheets of print execution of the auxiliary image print setting determined as an auxiliary image print setting for use in S507 (NO in step S509), then the process advances to step S512.

Next, in step S510, the CPU 201 generates image data of an auxiliary image, based on an auxiliary image print setting determined as an auxiliary image print setting for use in step S507.

Next, in step S511, the CPU 201 combines the print data received in step S502 and the image data of an auxiliary image generated in step S510. In the combination process, if a color of the auxiliary image is designated as transparent in step S605, information indicating that portions of transparent color are printed using a clear (transparent) toner, not usual CMYK toners, is added.

Next, in step S512, the print data combined in step S511 is printed by the printing unit 304, based on the print setting received in step S502. In printing process, when the color of the auxiliary image is designated as transparent in step S605, based on the information added in step S511, portions of transparent color are printed using a clear (transparent) toner, not usual CMYK toners.

Next, in step S513, a binding processing is executed by the binding processing unit 305, based on the print setting that is set in step S402 for the sheets printed in step S512. The binding processing may be executed by other apparatuses, not the printer 102.

Figure 15:
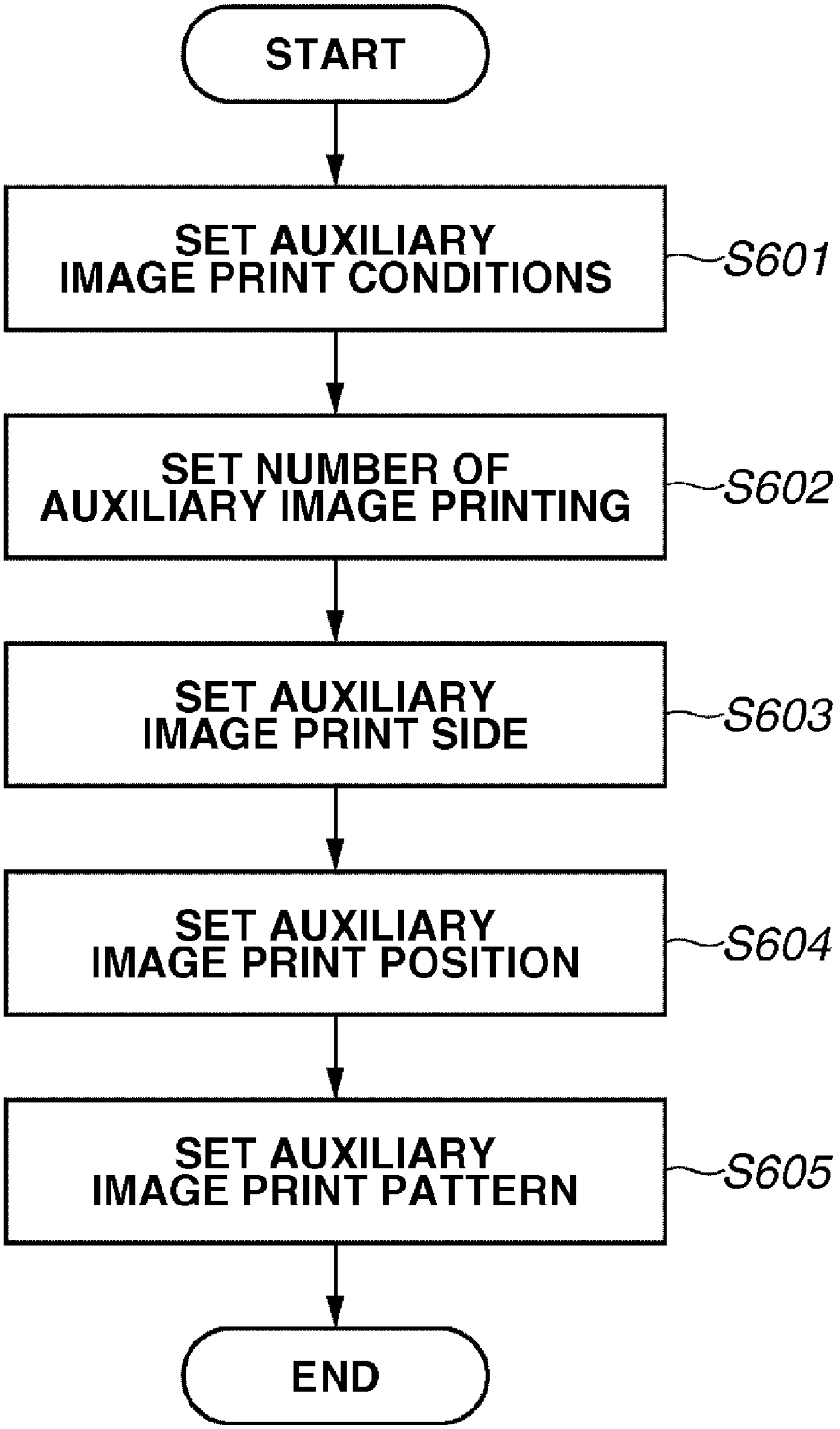
FIG. 15 is a flowchart illustrating a detail of a print setting for an auxiliary image according to the second exemplary embodiment.

FIG. 15 is a flowchart illustrating the detail of the print setting step S501 of an auxiliary image according to the second exemplary embodiment. An operation illustrated in the flowchart is implemented by causing the CPU 401 to read a program stored in the HDD 404 to the RAM 403 and execute it. Further, the auxiliary image print setting is executed by displaying UI screens illustrated in FIG. 10 to FIG. 12 on the display unit of the operation unit 302, and accepting an input from a user using the input unit of the operation unit 302.

First, in step S601, the CPU 401 accepts an input of a print condition for executing the auxiliary image printing.

The print condition refers to a condition under which an auxiliary image printing is executed when a print job having a print setting that agrees therewith is input. As a print condition, it is possible to set bookbinding type/print direction/open direction, and so on.

Next, in step S602, the CPU 401 accepts an input of the number of sheets of print execution for executing an auxiliary image printing. The number of sheets of print execution refers to a condition under which an auxiliary image printing is executed, when a print job having print data of greater number of pages is input. As a print execution, it is possible to set a specific numeral such as 10 pages or the like.

Steps S603 to S605 are identical to steps S201 to S203 of the first exemplary embodiment as described above with reference to FIG. 7. Therefore, descriptions thereof will be omitted. In addition, in step S601, the flowchart of FIG. 19 may be applied.

FIG. 16 is a table illustrating a list of auxiliary image print settings, which are set in the print setting step S501 of the auxiliary image according to the second exemplary embodiment. An auxiliary image print setting that is input in steps S601 to S605 is stored in the HDD 404 in a format illustrated in FIG. 16. In other words, binding positions of sheets and printing positions of auxiliary images are registered in association with each other.

By executing the inputs of steps S601 to S605 a plurality of times, a plurality of sets of auxiliary image print settings can be stored as illustrated in FIG. 16. An auxiliary image printing is executed using a clear (transparent) toner as a rule, but it may be executed using colors (CMYK) for use in usual printing. Further, when the clear (transparent) toner is printed on the whole surface of a sheet, an auxiliary image printing may not be executed.

In the second exemplary embodiment, the processes in step S101 and steps S503 to S511 are executed on the printer 102 side, but they may be executed on the PC 101 side. According to the second exemplary embodiment, the auxiliary image printing position can be easily set. Further, according to the second exemplary embodiment, an auxiliary image printing can be executed without performing an auxiliary image print setting on the PC side.

In a third exemplary embodiment, an auxiliary image printing position is automatically determined on the printer side. The configurations of the apparatus according to the third exemplary embodiment are identical to those in the first exemplary embodiment as described above with reference to FIG. 1 to FIG. 5, and therefore descriptions thereof will be omitted.

The operations of the apparatus according to the third exemplary embodiment are identical to those in the second exemplary embodiment as described above with reference to FIG. 13 to FIG. 15, and therefore descriptions thereof will be omitted. However, in the third exemplary embodiment, when image data of an auxiliary image is generated in step S510, an auxiliary image printing position is automatically determined, and therefore there is no need to accept a setting of an auxiliary image printing position in step S604.

Figure 17:
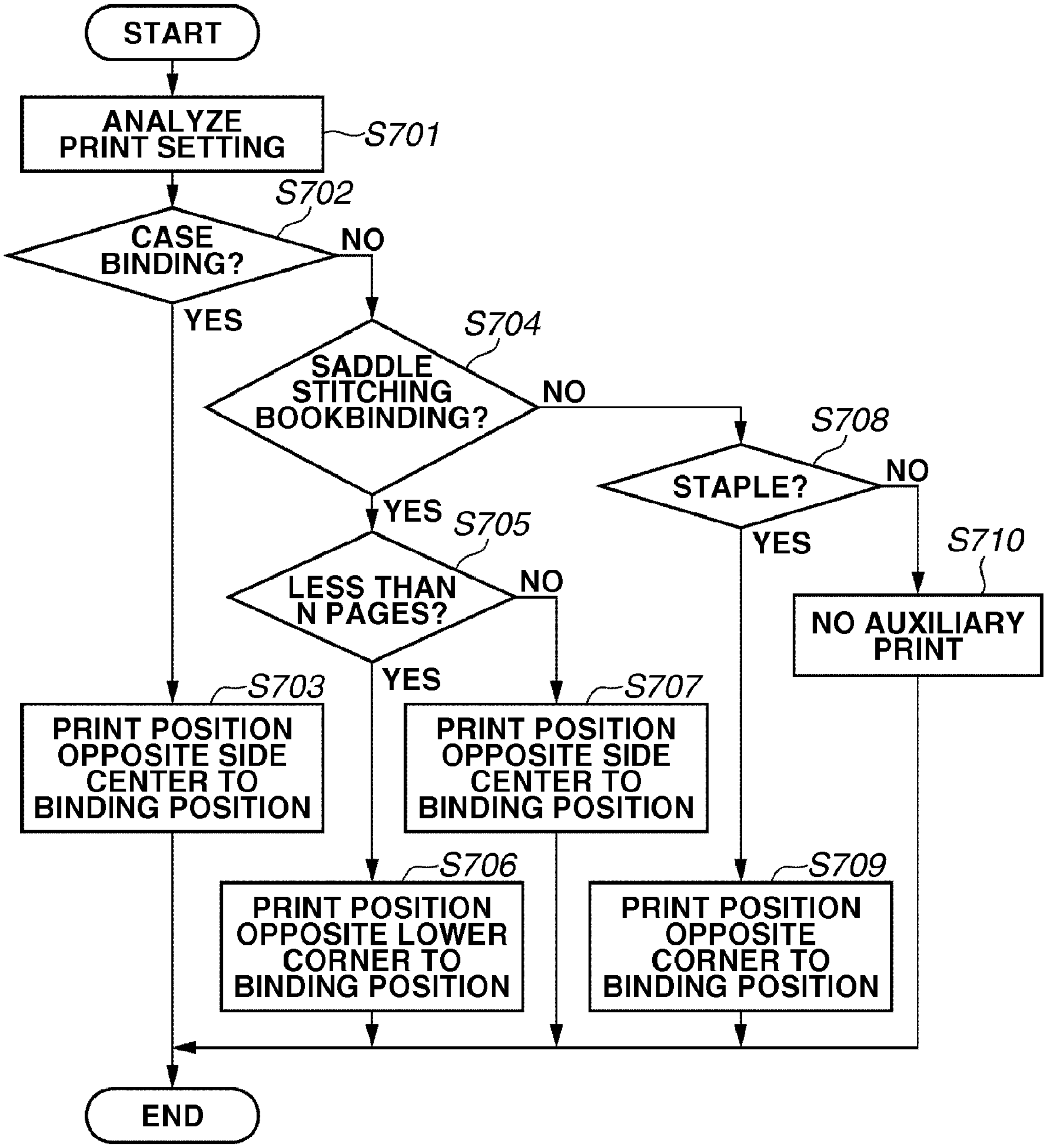
FIG. 17 is a flowchart illustrating an automatic setting of a printing position of an auxiliary image in an image data generation of an auxiliary image according to a third exemplary embodiment.

FIG. 17 is a flowchart illustrating an automatic setting of an auxiliary image printing position in the image data generation step S510 of the auxiliary image according to the third exemplary embodiment. In addition, an operation illustrated in the flowchart is implemented by causing the CPU 401 to read a program stored in HDD 404 to the RAM 403 and execute it.

First, in step S701, the CPU 401 analyzes a print setting included in a print job. Next, in step S702, the CPU 401 determines whether a bookbinding type is set to a case binding in the print setting analyzed in step S701.

If it is determined that a bookbinding type is set to case binding in step S702 (YES in step S702), then the process advances to step S703. If it is determined that a bookbinding type is not set to case binding in step S702 (NO in step S702), then the process advances to step S704.

If it is determined that a bookbinding type is set to case binding in step S702 (YES in step S702), then in step S703, an auxiliary image printing position is set to a center of an opposite side to a binding position in the print setting analyzed in step S701. If it is determined that a bookbinding type is not set to case binding in S702 (NO in step S702), then in step S704, the CPU 401 determines whether a bookbinding type is set to saddle stitching bookbinding in the print setting analyzed in step S701.

If it is determined that a bookbinding type is set to saddle stitching bookbinding in step S704 (YES in step S704), then the process advances to step S705. If it is determined that a bookbinding type is not set to a saddle stitching bookbinding in step S704 (NO in step S704), then the process advances to step S708.

If it is determined that a bookbinding type is set to a saddle stitching bookbinding in S704 (YES in step S704), then in step S705, the CPU 401 determine whether print data is less than N pages. A value N is determined as a default, but a user can change the value N if necessary.

If it is determined that print data is less than N pages in step S705 (YES in step S705), then in step S706, an auxiliary image printing position is set to a lower corner of an opposite side to a binding position in the print setting analyzed in step S701. If it is determined that print data is N pages or more in step S705 (NO in step S705), then in step S707, an auxiliary image printing position is set to a center of an opposite side to the binding position in the print setting analyzed in S701.

If it is determined that a bookbinding type is not set to a saddle stitching bookbinding in step S704 (NO in step S704), then in step S708, the CPU 401 determines whether a bookbinding type is set to a staple in the print setting analyzed in step S701. If it is determined that a bookbinding type is set to a staple in step S708 (YES in step S708), then the process advances to step S709. If it is determined that a bookbinding type is not set to a staple in step S708 (NO in step S708), then the process advances to step S710.

If it is determined that a bookbinding type is set to a staple, and the staple position is set to a corner of sheet in step S708 (YES in step S708), then in step S709, an auxiliary image printing position is set to an opposite corner to a binding position in the print setting analyzed in step S701. If it is determined that a bookbinding type is not set to a staple in step S708 (NO in step S708), then in step S710, an auxiliary image print is set to be not executed.

FIG. 18 is a table illustrating a list of results of automatic setting of an auxiliary image printing position in the image data generation step S510 of an auxiliary image being executed according to the third exemplary embodiment. In FIG. 18, the case of a binding position for bookbinding is at the left side (binding position for staple is at the upper left corner), and the case of a binding position for bookbinding is at the right side (binding position for staple is at the upper right corner) are described.

When a bookbinding type is a case binding, an auxiliary image printing position is at a center of an opposite side to a binding position in the print setting. In other words, when a binding position in the print setting is at the left side, an auxiliary image printing position will be at the right side. To the contrary, when a binding position in the print setting is at the right side, an auxiliary image printing position will be at the left side.

When a bookbinding type is a saddle stitching bookbinding and the number of pages of print data is less than N pages, an auxiliary image printing position will be at a lower corner of opposite side to a binding position in the print setting. In other words, when a binding position in the print setting is at the left side, an auxiliary image printing position will be at the lower right corner. To the contrary, when a binding position in the print setting is at the right side, an auxiliary image printing position will be at the lower left corner.

When a bookbinding type is a saddle stitching bookbinding and the number of pages of print data is N pages or more, an auxiliary image printing position will be at a center of an opposite side to a binding position in the print setting. In other words, when a binding position in the print setting is at the left side, an auxiliary image printing position will be at the right side. To the contrary, a binding position in the print setting is at the right side, an auxiliary image printing position will be at the left side.

When a bookbinding type is staple, an auxiliary image printing position will be at an opposite corner to a binding position in the print setting. In other words, when a binding position in the print setting is at the upper left corner, an auxiliary image printing position will be at the lower right corner. To the contrary, when a binding position in the print setting is at the upper right corner, an auxiliary image printing position will be at the lower left corner.

According to the third exemplary embodiment, an auxiliary image printing position can be set easily. Further, according to the third exemplary embodiment, an auxiliary image printing can be executed without setting an auxiliary image printing position in advance as an auxiliary image print setting.

Alternatively, the object of the present invention is also achieved by causing the above-described system or apparatus to read out a program of software from a storage medium and execute it for implementing functions of the above-described exemplary embodiments. In this case, a program itself read out from the storage medium will implement new functions of the present invention, and the program and storage medium that stores the program will constitute the present invention.

As a storage medium for supplying a program code, for example, a flexible disk, a hard disk, a read-only memory (ROM), optical disk, a magneto-optical disk, a compact disc read-only memory (CD-ROM), a digital versatile disc read-only memory (DVD-ROM), a digital versatile disc random access memory (DVD-RAM), a magnetic tape, a memory card can be used.

Further, the case where an operating system (OS) and the like working on a computer based on instructions of a program performs a part or the whole of an actual processing, and functions of the above-described exemplary embodiments are achieved by the processing is also included in the present invention.

Furthermore, the case where a program is written in a memory provided in function expansion unit or the like connected to a computer, and subsequently a CPU or the like provided in the function expansion unit performs a part or all of actual processing, and functions of the above-described exemplary embodiments are achieved by the processing is also included in the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-136684 filed May 26, 2008, which is hereby incorporated by reference herein in its entirety.

What is claimed is:

1. A print control apparatus comprising:

an input unit configured to input a binding position of sheets related to a binding processing for the sheets on each of which an image is printed based on print data;

a setting unit configured to set a printing position of an auxiliary image of transparent color to be printed with the image that is printed based on the print data, according to the binding position of the sheets input by the input unit; and a print control unit configured, based on the printing position of the auxiliary image set by the setting unit, to control printing of the auxiliary image, wherein the print control unit is configured not to execute printing of the auxiliary image, when a number of sheets on which printing is executed based on the print data is smaller than a predetermined number of sheets.

2. The print control apparatus according to claim 1, further comprising:

a determination unit configured to determine candidates of the printing position of the auxiliary image according to the binding position of the sheets input by the input unit; and a selection unit configured to select the printing position of the auxiliary image from the candidates of the printing position of the auxiliary image determined by the determination unit, wherein the setting unit sets the printing position of the auxiliary image selected by the selection unit.

3. The print control apparatus according to claim 2, wherein the determination unit determines at least one from among positions different from the binding position of the sheets as a candidate of the printing position of the auxiliary image.

4. The print control apparatus according to claim 3, wherein the determination unit determines, when a side of the sheets is input by the input unit as the binding position of the sheets, at least one position from among an upper position, a bottom position, and a center position of an opposite side to the binding position of the sheets as the candidate of the printing position of the auxiliary image.

5. The print control apparatus according to claim 3, wherein the determination unit determines, when an apex of the sheets is input by the input unit as the binding position of the sheets, at least one from among an apex opposite to the binding position of the sheets and a center of a side that forms an opposite side to the binding position of the sheets as the candidate of the printing position of the auxiliary image.

6. The print control apparatus according to claim 2, further comprising:

a generation unit configured to generate the print data; and a sending unit configured to send data, wherein the print control unit controls the sending unit to send the print data generated by the generation unit, data indicating the binding position of the sheets input by the input unit, and data indicating the printing position of the auxiliary image selected by the selection unit to a printing unit.

7. The print control apparatus according to claim 2, further comprising:

a generation unit configured to generate the print data;

a creation unit configured to create the auxiliary image;

a combining unit configured to combine the print data with data of the auxiliary image based on the printing position of the auxiliary image selected by the selection unit; and a sending unit configured to send data, wherein the print control unit controls the sending unit to send to a printing unit print data combined by the combining unit, and data indicating the binding position of the sheets input by the input unit.

8. The print control apparatus according to claim 2, further comprising:

a receiving unit configured to receive the print data;

a creation unit configured to create the auxiliary image; and a printing unit configured to print an image, wherein the print control unit controls the printing unit so as to print the image on the sheets based on the print data, and to print the auxiliary image on the sheets based on the printing position of the auxiliary image selected by the selection unit.

9. The print control apparatus according to claim 8, further comprising:

a binding control unit configured to control execution of the binding processing for the sheets on which printing has been executed by the printing unit, based on the binding position of the sheets input by the input unit.

10. The print control apparatus according to claim 9, further comprising:

a binding unit configured to execute the binding processing of the sheets on which printing has been executed by the printing unit, through a control by the binding control unit.

11. The print control apparatus according to claim 1, wherein the print control unit controls to execute a printing process of the auxiliary image using a transparent color material.

12. A method for controlling a print control apparatus, the method comprising:

inputting a binding position on sheets related to a binding processing for the sheets on which an image has been printed based on print data;

setting a printing position of an auxiliary image of transparent color to be printed on the sheets based on the input binding position of the sheets, which is to be printed with the image printed based on the print data; and controlling printing of the auxiliary image based on the set printing position of the auxiliary image, wherein printing of the auxiliary image is not executed, when a number of sheets on which printing is executed based on the print data is smaller than a predetermined number of sheets.

13. A non-transitory computer-readable storage medium configured to store a program to execute a method for controlling a print control apparatus, the method comprising:

inputting a binding position of sheets related to a binding processing on the sheets on each of which an image has been printed based on print data;

setting a printing position of an auxiliary image of transparent color to be printed on the sheets based on the input binding position of the sheets, which is to be printed with the image printed based on the print data; and controlling printing of the auxiliary image based on the set printing position of the auxiliary image, wherein printing of the auxiliary image is not executed, when a number of sheets on which printing is executed based on the print data is smaller than a predetermined number of sheets.

* * * * *